(12) United States Patent
Trevathan et al.

(10) Patent No.: US 11,055,783 B2
(45) Date of Patent: Jul. 6, 2021

(54) TRADING PLATFORMS USING MARKET SENTIMENT AND DYNAMIC RISK ASSESSMENT PROFILES

(71) Applicant: TTC HOLDINGS INC., Celebration, FL (US)

(72) Inventors: Matthew B. Trevathan, Roswell, GA (US); Matthew A. Terry, Celebration, FL (US); Andrew M. Calderon, Oakton, VA (US)

(73) Assignee: TTC HOLDINGS INC., Celebration, FL (US)

( * ) Notice: Subject to any disclaimer, the term of this patent is extended or adjusted under 35 U.S.C. 154(b) by 0 days.

(21) Appl. No.: 16/893,839

(22) Filed: Jun. 5, 2020

(65) Prior Publication Data
US 2021/0065294 A1    Mar. 4, 2021

Related U.S. Application Data

(60) Provisional application No. 62/892,697, filed on Aug. 28, 2019.

(51) Int. Cl.
*G06Q 40/04*     (2012.01)
*G06Q 50/00*     (2012.01)
(Continued)

(52) U.S. Cl.
CPC ............ *G06Q 40/04* (2013.01); *G06F 40/30* (2020.01); *G06N 5/043* (2013.01); *G06N 20/00* (2019.01);
(Continued)

(58) Field of Classification Search
CPC ........ G06Q 40/04; G06N 20/00; G06N 5/043; G06F 40/30; H04L 63/102
See application file for complete search history.

(56) References Cited

U.S. PATENT DOCUMENTS 7,249,080 B1 *  7/2007  Hoffman ............... G06Q 40/00
                                                  705/35
7,373,324 B1 *  5/2008  Engin .................... G06Q 40/00
                                                  705/35
(Continued)

OTHER PUBLICATIONS

Shashank Gupta, "Sentiment Analysis: Concept, Analysis and Applications, Jan. 7, 2018", https://towardsdatascience.com/sentiment-analysis-concept-analysis-and-applications-6c94d6f58c17, Jan. 7, 2018, 12 pages.
(Continued)

*Primary Examiner* — Scott C Anderson
(74) *Attorney, Agent, or Firm* — Andrew M. Calderon; Roberts Calderon Safran & Cole, P.C.

(57) ABSTRACT

The disclosure is directed to a trading platform and, more particularly, to systems and processes for simplifying market based investments using market sentiment and dynamic risk assessment profiles. A method implemented in a computer infrastructure has computer executable code tangibly embodied on a computer readable storage medium having programming instructions operable to: determine dynamic risk assessment profiles of different users; obtain trading information from disparate electronic sources; generate at least one investment opportunity with a risk profile using the trading information and matching the investment opportunity with the dynamic risk assessment profiles of a selected user or of the different users; and provide at least one trading recipe which is configured to convert the at least one investment opportunity into a simplified executable trade for the selected user.

23 Claims, 11 Drawing Sheets

(51) Int. Cl.
G06Q 40/08 (2012.01)
G06F 40/30 (2020.01)
G06N 5/04 (2006.01)
G06N 20/00 (2019.01)
H04L 29/06 (2006.01)

(52) U.S. Cl.
CPC ............ G06Q 40/08 (2013.01); G06Q 50/01 (2013.01); H04L 63/102 (2013.01)

(56) References Cited

U.S. PATENT DOCUMENTS

| | | | | |
|---|---|---|---|---|
| 8,452,682 | B1* | 5/2013 | Gastineau | G06Q 40/04 705/36 R |
| 2010/0005034 | A1* | 1/2010 | Carpenter | G06Q 40/06 705/36 R |
| 2014/0012780 | A1* | 1/2014 | Sanders | G06Q 30/0213 705/36 R |
| 2014/0358664 | A1* | 12/2014 | Wheeler | G06Q 30/0226 705/14.33 |
| 2015/0254556 | A1* | 9/2015 | Getson | G06Q 40/04 706/16 |
| 2017/0011462 | A1* | 1/2017 | Anliker | G06Q 40/06 |
| 2018/0330456 | A1* | 11/2018 | Odutola | G06Q 40/06 |
| 2019/0394511 | A1* | 12/2019 | Kalaboukis | H04N 21/26258 |

OTHER PUBLICATIONS

Khan Saad Bin Hasan, "Stock Prediction Using Twitter Ever wondered if you could predict the stock market what you can do?", https://towardsdatascience.com/stock-prediction-using-twittere432b35e14bd?gi=cc7bead1311e, Jan. 3, 2019, 12 pages.

* cited by examiner

TRADING PLATFORMS USING MARKET SENTIMENT AND DYNAMIC RISK ASSESSMENT PROFILES

FIELD OF THE INVENTION

The disclosure is directed to a trading platform and, more particularly, to systems and processes for simplifying market based investments using market sentiment and dynamic risk assessment profiles.

BACKGROUND

Most trading platforms assess a customer's risk by asking profiling questions about trading and trading habits to determine if a trading risk level is suitable for a customer. For instance, upon signing up for a brokerage account, a customer may be asked a series of questions to determine their risk tolerance and trading acumen, e.g., if they are familiar with options trading. Based on many different questions, as an added service, the brokerage can provide a static risk assessment to the customer which, in turn, can be used as a basic guide for trading stocks, bonds, commodities, etc.

The static risk assessment does not provide any specific trading strategies such as which particular stocks should be selected by the customer, etc.; instead, the traditional trading approach requires extensive researching by the user of a particular company, market, or desired trading strategies, i.e., complex trading strategies such as stock options and futures trading. This approach requires a large amount of time to investigate the health and outlook of various companies or markets as well as understanding complex trading strategies such as stock options and futures trading. Moreover, complex strategies such as trading with options, puts, calls, becomes so difficult that even with extensive research the average investor will not attempt to trade with such market vehicles.

In other trading scenarios, stocks are screened based on a user's self-assessed measurement of risk, that may match the behavioral assessment of risk. However, a user may become more or less adverse to risk over time for a number of reasons, including understanding the mechanics of trading or changes to their personal or financial situation. The use of a static profile or risk assessment leads to several problems, e.g.:

1. The use of a static profile or risk assessment does not account for a user's actual risk level as their trading evolves;

2. The use of a static profile or risk assessment may not represent the true risk level for a person, since the trader may think they are more or less adverse to riskier trades than they really are based on actual trading patterns; and 3. There is no way to profile and screen investment opportunities on a user's actual risk level and present opportunities that match the user's ideal level of risk when that risk level is inaccurate or based on out of date factors.

SUMMARY

In a first aspect of the invention, there is a method implemented in a computer infrastructure having computer executable code tangibly embodied on a computer readable storage medium having programming instructions operable to: determine dynamic risk assessment profiles of different users; obtain trading information from disparate electronic sources; generate at least one investment opportunity with a risk profile using the trading information and matching the investment opportunity with the dynamic risk assessment profiles of a selected user or of the different users; and provide at least one trading recipe which is configured to convert the at least one investment opportunity into a simplified executable trade for the selected user.

In another aspect of the invention, there is a computer program product comprising one or more computer readable storage media having program instructions collectively stored on the one or more computer readable storage media, the program instructions executable to: obtain trading prospects and sentiment of the trading prospects from a plurality of electronic sources; analyze the trading prospects and sentiment of the trading prospects to determine a risk associated with each of the trading prospects; package selected trading prospects as investment opportunities with different fixed or configurable trading recipes each of which have a different risk and/or investment outlook; provide the different fixed trading recipes to one or more users in a personalized list; and receive execution instructions for at least one of the different fixed trading recipes and accepting a simplified user action to send the execution instructions to a brokerage account which is integrated with a platform that generated the fixed trading recipes.

In another aspect of the invention, there is system comprising: a user account configured to maintain a user repository including an intelligent risk profile, authentication data, preferences, account settings and history of the user; an ingestion engine configured to ingest data at scale, in real-time, the ingested data being ingested from various incoming streams of content feeds; a machine learning engine configured to rate opportunities based on integration of the ingested data including at least one sentiment that is a contextual mining of text that identifies and extracts subjective information from the ingested data, and use the ingested data with the risk profile to generate different trading recipes of different opportunities with different risk profiles for the user; an execution engine configured to allow the user to integrate the different trading recipes with an external brokerage account; and an event execution engine configured to track the user's interactions and provide a scalable solution for creating opportunity recommendations for the user with different trading recipes by working in conjunction with the machine learning engine. The ingestion engine, the machine learning engine, the execution engine and the event execution engine run on a processor of the system, in combination with a computer readable memory, one or more computer readable storage media, and program instructions collectively stored on the one or more computer readable storage media.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
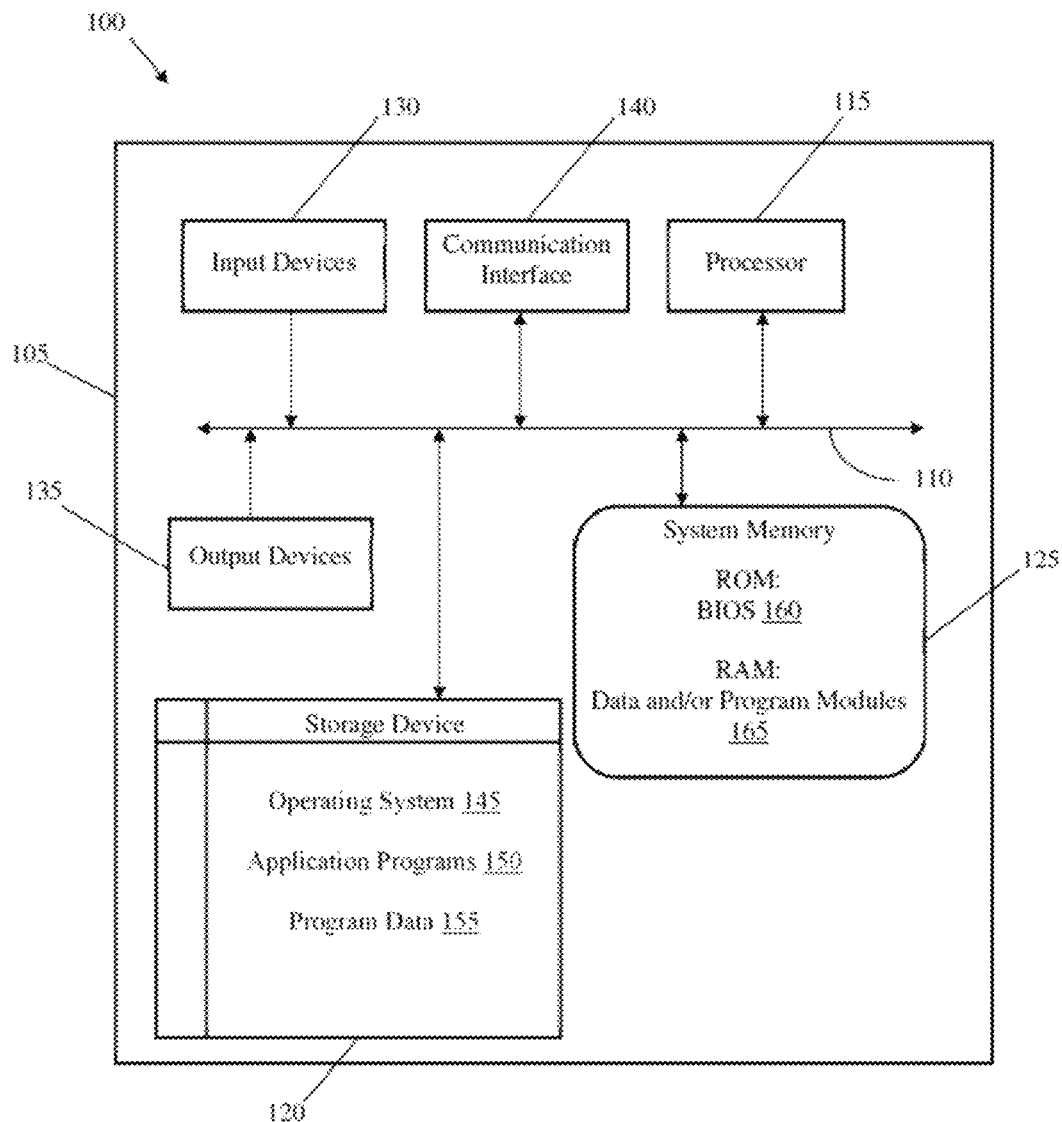
FIG. 1 depicts a computing system according to aspects of the present disclosure.

The disclosure is directed to a trading platform and, more particularly, to systems and processes for simplifying market based investments and related front end modules and back-end architectures. More specifically, the systems and processes simplify market based investments by using market sentiment and dynamic risk assessment profiles, amongst other technical solutions, to generate different trading opportunities and underlying recipes which can be easily executed by the user (trader). For example, in embodiments, the systems and processes make it possible for non-professionals to benefit from the advantages of a professional trading approach while eliminating research time and deep knowledge necessary for implementing complex trading strategies by generating opportunity recommendations and then executing upon a single or multiple preconfigured trading recipes. In this way and advantageously, the systems and processes provide investment opportunities that greatly reduce the complexity of option based trading of stocks or other commodities across brokerage houses or by leveraging a simple investment brokerage account to perform group trades/fractional trades based on preconfigured and/or fixed trading recipes.

Companies are building frameworks for simple social media to let people share some of their trades, but the solutions lack the ability to pull disparate relationships, such as user's risk level, preferred sectors, current assets and varying sentiment values, performance of sectors or individual trades, amongst other relationships, to recommend investment opportunities for trades on a stock level, let alone a futures level, such as options, that are comparably more complex than a simple stock trade, amongst other technical problems. These and other technical problems are solved by the present disclosure in that the platform described herein provides a way in which trades or other types of complex investment transactions can be shared and packaged as an opportunity to the user in a simple framework for future execution of complex trading opportunities.

Accordingly, the platform described herein solves technical problems using a technical solution lying computing systems and platforms to determine different relationships, combine these different relationship into different types of trading opportunities backed by an execution recipe, and package such opportunities and recipes to allow simplified and automated execution of complex transactions within an integrated brokerage account, taking into consideration very disparate information from disparate sources. With this noted, the present disclosure is not merely displaying information for execution of a trade, but uses information gathered and processed from many different sources and makes many different relationships and assumptions with such data to continuously package and update different trading opportunities (with different risk levels) using sentiments of users, creators, the market, itself, and a host of other factors such as trends, business data, etc. Indeed, the specification notes that the platform described herein uses complex algorithms and neural networks to create different trading packages which can be updated, in real-time, based on various different factors and which functions and advantages cannot be done on existing processing platforms, and that very specific techniques not previously known to those skilled in the art are now shown to be implemented herein to provide the advantages and functions of the platform. And, currently, a successful trader cannot possibly anticipate the market in the manner described herein, in that many different disparate factors, some seemingly unrelated and constantly changing, are used herein to provide different execution packages or opportunities.

In embodiments, the systems and processes can be implemented within any type of trading exchange, including stocks, commodities, derivatives, swaps, and any combination of other financial instruments. In further embodiments, the systems and processes comprise a series of subsystems that enable users to take advantage of investment opportunities (within any trading exchange) through a social powered ecosystem such as, e.g., consumer sentiment, professional recommendations, etc., to generate and executed trading recipes. The trading recipes can also use various factors, e.g., volumes of all the buys and sells of different trading alternatives, e.g., puts and calls, to formulate different preconfigured recipes, all of which are displayed to the user for their selection and execution of certain trades. For example, by implementing artificial intelligence and machine learning methodologies, the systems and processes take into account community shared insights to formulate different trading recipes (e.g., preconfigured trading opportunities) that best meet a user's needs. In this way, the systems and processes described herein, as a whole, provide a technological feature that solves a technical problem using a technical solution; that is, the systems and processes offers a preconfigured and personalized list of investment opportunities with associated trading recipes, that allows a trader to understand and trade on complex trades as a single action, for any number of different trading scenarios.

Moreover, by taking into account market sentiment and dynamic risk assessment profiles, amongst other technical solutions, to generate preconfigured opportunities and trading recipes, the systems and processes greatly simplifies understanding what a user can buy before they attempt to execute the recipe. And, in embodiments, because a trading recipe can include an entire pattern of puts, calls, buys and sells, etc., as a single purchase, there is no danger of starting a market play that the investor cannot fulfill due to the fact that some of the trading opportunities (sells or buys) not being available when the investor executes the play (trade).

Also, as a single trading recipe can be used for a plurality of complex trades, it is less likely that the investor will make a typing error buying too many contracts of a specific part of the pattern since the recipe is set up for the user to automate the various parts in a single action, etc. Lastly, and importantly, by providing preconfigured trading recipes for executing an opportunity, it provides the investor with the ability to recognize, understand and discriminate between different trading opportunities using the same commodities based on their risk profiles, amongst other factors, which are constantly and dynamically changing after each trade or for other reasons. The complexity of recommending transactions leverages a plurality of variables that match the investor with the investment package. For example, FIGS. 13 and 14, which are described in more detail below, show how an investment opportunity exists in the market and how the systems and processes assists a contributing user to use recipe templates to create specific instances of recipes for executing each of the identified opportunities based on the stock's volatility, market sentiment, the current financials and past trends etc. with the investor's tolerance for risk, their past buying and selling profile and their available capital recommending easily executed trades using Multidimensional computation of suggested opportunities paired with multidimensional computation of inferred investor preference to yield recommendations that maximize execution rate.

Overview of System and Processes (Trading Platform)

Figure 2:
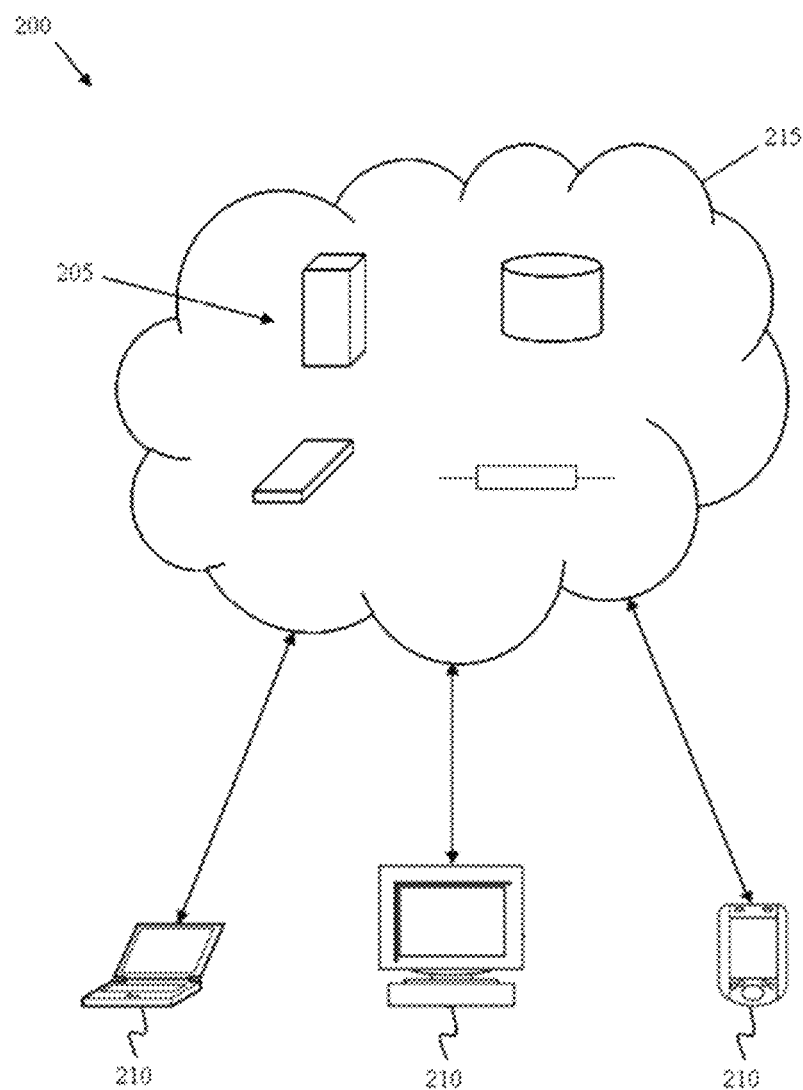
FIG. 2 depicts a cloud computing environment according to aspects of the present disclosure.

The functional components of the systems and processes (trading platform) provides a simplified stock market based investment platform which can be implemented on the computing infrastructure of FIG. 1 and over the cloud computing system as outlined in FIG. 2. The following describe the components of the systems and processes.

Investor

An investor is a person using the trading platform to find opportunities and use associated recipes to execute trades on the platform. The investor is also referred to as a trader.

User Account

The user account is a master repository for connecting the user (e.g., trader) to various roles (e.g., creator to investor) and various components of the systems such as brokerage accounts, etc. The user account maintains a user repository including a profile, authentication data, preferences, account settings and history. The user account also maintains connection profile information to their brokerage accounts, a virtual broker and an execution or broker bot, as examples.

Broker Integration Component

A broker integration component allows users to integrate the systems and processes described herein (referred to hereinafter also as a "trading platform") with their external stock trading account at a traditional online stock brokerage house. This broker integration component allows the trading platform to invoke APIs of the external online stock broker's platform to execute stock trading actions on behalf of the user. The API is a set of programming code that queries data, parses responses, and sends instructions between one software platform, i.e., the systems and processes described herein which simplify stock market based investments, and another platform, i.e., brokerage account or other external components.

In the context of trading, a trader will often use an API to establish a connection between a set of automated trading algorithms and the trader's preferred trading broker platform for the purpose of obtaining real-time pricing data and place trades. These actions can be options, commodity purchases, derivatives, swaps, shorts, call options, futures, exchange traded funds, etc. and/or, interestingly, any combination of any of these different trading schemes by a single user or a community of users as described herein. As to the latter feature, the systems and processes described herein can create its own mutual type fund (e.g., trading recipe) of different investment opportunities and seek a single user or a community of users to purchase the "mutual type fund" of disparate instruments based on risk factors of the individual or community. So, it should be understood by those of ordinary skill in the art that the systems and processes described herein simplify market based investments for many different exchanges including security, commodity, derivatives, swaps and other financial instruments as described herein.

Opportunity Registry

The opportunity registry is dynamic collection of configured opportunities (e.g., investment opportunities which are preconfigured recipes for execution) available to users of the trading platform. The opportunity registry is continuously updated by adding new opportunities and removing expired opportunities. The opportunity registry can determine, by analysis, different trading opportunities and provide such opportunities to the trader in a simplified opportunity.

Opportunity and Recipe

An opportunity is a package of information describing a market based investment opportunity where a significant change in value is expected in a relatively short amount of time. The information contained in the opportunity includes details of why a significant change is expected, when it will occur, and what factors would cause the change to be an increase or a decrease in value. The opportunity package also includes an opportunity execution plan as a trading recipe, which details a set of trading steps required to execute the investment. Typically, these trading steps will include the ability for the user to choose between investing in an increase or in a decrease in value at varying degrees.

When a user executes an opportunity, the system can record the type of opportunity in the opportunity registry or other database, and use this data to target the users in the future based on the type of opportunity the user purchased. This is tracked in the order history of each account holder. The opportunity creator matches opportunity characteristics with users that typically selected and profited from similar opportunities in the past. This matching could exist on any number of characteristics such as a specific company, a specific sector, a specific chart pattern, a specific type of news event such as a rumored merger or earnings event, or a large short seller interest in the stock.

Intelligent Opportunity Creator

An intelligent opportunity creator is artificial intelligence (AI) consisting of a group of intelligent agents that look at past opportunities, past trends in the markets, and additional data, such as news feeds, social sentiment, risk profiles, etc., to determine if there is a possible trading opportunity. If there is a recognized past pattern, such as a company that follows a cyclic pattern over multiple cycles or receives data that may drive stock price, it can use this data to create new opportunities with trading recipes or reload a past opportunity if there are trends that lead the system to determine the opportunity exists again.

The intelligent opportunity creator also continuously rates and ranks opportunities based on integration to various sentiments and machine learning systems where news feeds and use forum data from community sites are continuously scanned to calculate a trending user sentiment on the specific opportunity, the company, the sector or the overall stock market trend. The intelligent opportunity creator can also (i) target past investors by looking at their order history and (ii) look at the order history of current investors and recommend new opportunities based on trends of what people are buying or looking at within current opportunities, amongst other functionality described herein.

Accordingly, the opportunity is generated by the intelligent opportunity creator (AI), which gathers information that may affect the price of a trade, e.g., an option, commodity, asset, exchange, etc. The AI can gather this information from a plurality of different sources, i.e., crawling through a host of different databases over, e.g., the internet, including brokerage houses, financial institutions, financial sources (magazines), market analysis, social media, etc., collate this information and provide an analysis as to how this information may affect prices of stocks, money exchanges, commodities, futures, etc., which is then provided to the user for execution. In this way, the intelligent opportunity creator (AI), for example, can provide analysis as to why a significant change is to be expected based on a host of different factors, i.e., past trends and/or current market conditions, external factors, i.e., conflict in a certain oil producing region which would indicate fluctuations in gas and/or oil production which may affect pipeline or transportation issues, oil prices, etc. or a host other internal company issues, external company issues, etc. The AI can also determine trends based on past performances, either with a particular company or industry as a whole. The AI can also look at past trading patterns of certain individuals, mutual funds, spiders, large shareholders of certain companies, venture capital funds, etc. All of this information can be gathered together, how disparate they may be, for analysis, to determine and identify current trading opportunities.

Opportunity Execution Bot

An opportunity execution bot acts on behalf of the user once the user elects to invest in an opportunity as presented via a trading recipe. The opportunity execution bot (also referred to as the execution bot or broker bot) processes the trading steps included in the trading recipe that is part of the opportunity package, and executes them via the broker integration component. This process executes trades on stock or options or other types of trades in the user's external online brokerage account using the funds available in that account. The opportunity execution bot is also responsible for periodically retrieving the status of the investment such as the gain or loss and responsible for eventually closing any trades or positions based on the recipe trading steps in the opportunity package.

Opportunity Creator

An opportunity creator is a user that can modify an opportunity and associated trading recipe already created by the AI (or other neural networks), e.g., intelligent opportunity creator, which is then loaded into the opportunity registry for other users to review and execute via the associated recipes. The opportunity creator can also approve opportunities created by the intelligent opportunity creator, e.g., AI.

Opportunity Rules

The systems and processes described herein, e.g., opportunity engine, can use a business rules grammar for defining trades written in readable English, but created by either or both the AI and the user. By way of an example using dollar cost averaging, amongst other examples:

Name: "DollarCostAverage"
rule description: "Dollar Cost Averaging Sell"
condition: "SO>26 and opportunity is not expired"
actions: "sell SO of user shares"
rule description: "Dollar Cost Averaging Buy"
"condition": "SO<25 and SO>23 and shares not already purchased and opportunity is not expire"
Condition: "SO opportunity is expired"
actions: "sell SO of user shares"
Actions: "buy SO of user shares"
Name: "Bull Call Spread"
rules description: "Bull Call Buy"
Actions: "buy call SO at 3.30 of user contracts*suggested buy units"
rule description: "Bull Call Sell"
Actions: "sell call SO at 1.50 of user contracts*suggested sell units"

Arbiter and Bots (i.e., Part of the Opportunity Creator)

An arbiter and one or more bots work together as part of the intelligent opportunity creator (AI) to spot new opportunities. For example, the intelligent opportunity creator can have bots that scan opportunities and trending charts, such as a head and shoulders chart or charts that are looking for support line in a falling stock and mark/create an opportunity to buy or sell based on specific chart patterns, e.g., see Kirk Du Plessis, "13 Stock Chart Patterns That You Can't Afford To Forget" (https://optionalpha.com/13-stock-chart-patterns-that-you-cant-afford-to-forget-10585.html).

In embodiments, the arbiter can be the central gateway to new opportunities, and the bots can list possible opportunities to the arbiter. The arbiter can maintain posting rules and, e.g., can exclude certain industries, stocks or currencies to keep them from being posted as opportunities. The arbiter framework allows new bots to be easily added to perform work looking for opportunities and submit these opportunities to the arbiter. For example, trending bots can be added to look at what users are viewing for opportunities, as well as what users are buying as opportunities, to recommend a higher rating for a current opportunity look for similar opportunities in the same sector passed on current charting trends, news and other factors that can be filtered by the bot.

As another example of a bot implemented with the intelligent opportunity creator, is a bot that looks at past opportunities, and can scan cyclic opportunities and patterns of a particular stock or stocks. The bot can review the opportunities based on date ranges or other factors. For instance, some stocks typically trend higher in specific months and flatten or trend down in others. The bot can spot an opportunity by reviewing the data from market sources, such as financial sites, brokerage sites, or other financial news organizations for history data. The creator can then send notifications to users that made purchase of the past opportunity.

Leaderboard

The leaderboard tracks a list of most successful users over various periods of time such as weekly, monthly, quarterly and yearly (or other predetermined time period) based on the percentage gains they have achieved with their picks and executions of opportunities. The leaderboard also tracks a list of most successful opportunities and recipes based on the summation of gains of all users that executed that opportunity. The leaderboard also tracks a list of most successful opportunity creators based on the total gains of all the users that executed on opportunities created by that opportunity creator. The information from the leaderboard can be used by the AI to determine best practices, trends and different opportunities, and using such information generate new trading recipes or updated existing trading recipes.

Approver

An approver is any user with rights to publish an opportunity (i.e., finished recipe) to the public. An opportunity creator or the AI can also be their approver or work with a separate approver.

Virtual Brokerage

A virtual brokerage component provides the ability for a user to execute opportunities using the associated recipes, using an account with no actual monetary value. This virtual brokerage account can be provided directly in the trading platform or can be provided via the brokerage integration component when connecting to a $3^{rd}$ party online brokerage that offers virtual trading.

Configurable Execution of Opportunities

The trading platform allows the user the ability to configure an execution for a selected opportunity by adjusting the strike price or other variable. For example, a user may expect the ABC stock to jump more than 6%. The user can select the opportunity fixed execution trade for 4%+ and modify the strike price from 102 to a higher number such as 104 with the expectation the stock will rise to 106. In this case, the call option for 104 would be at a much lower price of $0.30. Each $30 invested would return $200 for a profit of $170 (567%).

Premium Opportunities

The trading platform allows opportunity creators or the intelligent opportunity creator to classify an opportunity in a premium tier that requires users to purchase or acquire a certain privileged tier on the trading platform before viewing premium opportunities. The trading platform collects any paid premium for privileged access and allocates a percentage of the revenue to opportunity creators of premium opportunities.

Shared Success Opportunities

The trading platform allows opportunity creators or the intelligent opportunity creator to classify an opportunity as a shared success opportunity where they specify a price for executing the opportunity. The price is specified in a percentage of gains generated by the user when executing the opportunity. For example, the price of a shared success opportunity would be set at 5%. If a user executes the shared success opportunity and realizes a profit of $100, then that user would owe the opportunity creator a fee for using his opportunity. In embodiments, no fee is owed if the opportunity does not result in a profit.

Trends

The opportunity creator or the intelligent opportunity creator can obtain past trends using different databases, e.g., trends database. These different trends may be different stocks, commodities, derivatives, trends of different individuals or institutions. In embodiments, the creator reviews the past and current trends by analyzing the trends, and the creator can then create an opportunity from such analyzed trends. The opportunity is provided to the opportunity register. The opportunity register retrieves user permissions from the account (user's accounts), which can be confirmed by the creator. The opportunity register will authorize the access to the account and the opportunity register will create the opportunity for the creator.

Trending Opportunity

For each opportunity, the trading platform maintains a count of how many users have executed the opportunity and which scenario each user selected. The trading platform displays to all users as part of the opportunity registry a list of trending opportunity scenarios that are most selected by users. For example, the trading opportunity can be an opportunity most selected by other users or most selected by specific preferences set or inferred by the user. For instance, if the user likes bull trades or if the user likes a specific sector, these may filter higher on the trending opportunity because they match preferences from the user's history.

The opportunity engine can identify possible dollar cost averaging patterns, as an example. For example, these are stocks where the stock floats between a small range or even remains almost level. For instance, a stock may constantly trade between $25 and $26 dollars. If there is a good fluctuation of the stock, between $25 and $26, the opportunity engine can setup a trade the buys at $25 and sells at $26 for a defined period of time. For instance, an opportunity could run for a month where every time the stock drops to $25, the opportunity engine will automatically buy the stock. The opportunity engine can add stop on the stock will automatically sell the stock if the stock falls below $22 to limit losses. During this time period, the stop will automatically buy when it falls under $25 a share. When the stock reaches $26, the execution engine will automatically sell the stock. When the stock drops to $25 again, the systems and processes described herein, e.g., execution engine, will purchase the stock again until the stock reaches $26 a share. If there is 100 units of the stock and this small fluctuation happens 50 times during the month, it is possible to profit about $5,000.

Watch List

If a user is interested in an opportunity, but does not want to invest using their real or virtual account, the user may elect to add the opportunity to a watch list. As part of this process, the user can make a selection on the opportunity scenario they think is most likely to occur. The trading platform will maintain a list of all opportunities on the user's watch list and indicate the status of the opportunity along with the expected gain/loss percent if the user had executed the opportunity. Additionally, the trading platform will include a count of users watching each opportunity as part of the opportunity registry.

Notifications

Notification and alerts provide information to the user (investor or opportunity creator). The user can configure various alerts and notifications. For example, a user will receive notifications based on the progress of their executed opportunities or opportunities on their watch list. Users can also receive notifications on trending opportunities or new opportunities created by certain opportunity creators. For example, if the opportunity creator recommends to close out a trade, the user may receive a notification that the user needs to close the order out or the platform can automatically close the order out and inform the user. Closing an account can include, e.g., selling off the positions.

Community Funded Investment

Some opportunities require a significant investment to get started. These cases can be referred to as mega opportunities, and they may require investment from multiple investors in the market. Users can buy into an unfunded opportunity that will execute for a group of users by once funded or will expire if the opportunity expires without debiting any funds from the users brokerage accts.

For instance, an investor may want to purchase a part of a specific real estate, but cannot afford to buy the entire property. The systems and processes are configured to allow a holding company to fund the purchase of the real estate by multiple investors with a probable payout over a period of time. This is called an unfunded opportunity. Users could also buy into direct shares of large stocks or even option buying that would otherwise be unaffordable by buying into a percentage of an actual share or option. In this case, an opportunity is created allowing a user to buy a share of a certain stock or a certain portion of an option for a set amount of time and money.

Moreover, in other cases, the user could buy into a mix of opportunities such where they spread their money across a group of opportunities funded as a single opportunity. (This is a mutual fund of buys into multiple options instead of a single option.) In this case, funding the larger purchase may be out of the reach of the average investor and require the investment of multiple investors.

Computing Infrastructure and Environment Implementing the Trading Platform

FIG. 1 depicts a computing system according to aspects of the present disclosure. In embodiments, the computing system 100 can be representative of a system, a method, and/or a computer program product at any possible technical detail level of integration. The computing system 100 is capable of providing and integrating all of the functionality described herein, including, for example, (i) creating and presenting any number of different opportunities as trading recipes by analyzing, collating and presented data in a usable format through the trading recipes of different complex trading opportunities, (ii) creating and presenting any number of different notifications, (iii) integrating with external components, e.g., brokerage accounts, by using APIs, (iv) implementing the different components such as intelligent opportunity creator (AI), arbiter, etc., and (v) analyzing data to provide trends, etc., and using the trends and other information when generating different trading recipes, as some examples.

The computer program product may include a computer readable storage medium (or media) having computer readable program instructions thereon for causing a processor 115 to carry out aspects of the present invention as described herein. The computer readable storage medium can be a tangible device that can retain and store instructions for use by an instruction execution device. The computer readable program instructions may be stored in the computer readable storage medium that can direct the computer system 100, a programmable data processing apparatus, and/or other devices to function in a particular manner, such that the computer readable storage medium having instructions stored therein comprises an article of manufacture including instructions which implement aspects of the function/act specified in the flowchart and/or block or blocks of the architectural (block) diagram.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable program instructions described herein can be downloaded to respective the computing/processing device (e.g., computing system 100) from the computer readable storage medium or to an external computer or external storage device via a network, for example, the Internet, a local area network, a wide area network and/or a wireless network. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more known programming languages. The computer readable program instructions may execute entirely on the user's computer, partly on the user's computer, as a stand-alone software package or any combination thereof including partly or entirely on any combination. A remote computer may be connected to the user's computer through any type of network, including a local area network (LAN) or a wide area network (WAN), or the connection may be made to an external computer (for example, through the Internet using an Internet Service Provider).

Referring now specifically to FIG. 1, an illustrative architecture of a computing system 100 implemented as embodiments of the present invention is shown. The computing system 100 is only one example of a suitable computing system and is not intended to suggest any limitation as to the scope of use or functionality of the systems described herein. Also, computing system 100 should not be interpreted as having any dependency or requirement relating to any one or combination of components illustrated in computing system 100.

As shown in FIG. 1, the computing system 100 includes a computing device 105. The computing device 105 can be resident on a network infrastructure such as within a cloud environment (as depicted in FIG. 2), or may be a separate independent computing device (e.g., a computing device of a third party service provider). The computing device 105 may include a bus 110, the processor 115, a storage device 120, a system memory (hardware device) 125, one or more input devices 130, one or more output devices 135, and a communication interface 140.

The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more conventional processors or microprocessors that include any processing circuitry operative to interpret and execute computer readable program instructions, such as program instructions for controlling the operation and performance of one or more of the various other components of computing device 105. In embodiments, the processor 115 interprets and executes the processes, steps, functions, and/or operations of the present invention, which may be operatively implemented by the computer readable program instructions. For example, the processor 115 can execute any of the functionality of the functional components, swim lane diagrams, blocks of the block diagrams or any portions or combinations thereof as described herein. For example, the processor can be representative any of the following components of FIG. 3, including (i) ingestion layer, (ii) analytics, (iii) learning, (iv) engagement, (v) user account, (vi) micro-services, (vii) query layer, (viii) event layer or any of its subcomponents. It should be recognized by those of ordinary skill in the art, that each layer of component can be a separate "engine" or a combination of engines that execute upon the functionality provided herein and particularly those shown in the architecture of FIG. 3.

In embodiments, processor 115 may receive input signals from one or more input devices 130 and/or drive output signals through one or more output devices 135. The input devices 130 may be, for example, a keyboard or touch sensitive user interface (UI) as further described below. The output devices 135 can be, for example, any display device, printer, etc., as further described below.

The storage device 120 may include removable/non-removable, volatile/non-volatile computer readable media, such as, but not limited to, non-transitory media such as magnetic and/or optical recording media and their corresponding drives. The storage device 120 can be representative of the opportunity registry (recipe repository), amongst other storage systems. Also, the drives and their associated computer readable media provide for storage of computer readable program instructions, data structures, program modules and other data for operation of computing device 105 in accordance with the different aspects of the present invention. For example, in embodiments, the storage device 120 may store operating system 145, application programs 150, and program data 155 in accordance with aspects of the present invention. In embodiments, the storage device 120 can be an opportunity register.

The system memory 125 may include one or more storage mediums, including for example, non-transitory media as already described herein. In embodiments, an input/output system 160 (BIOS) including the basic routines that help to transfer information between the various other components of the computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

The one or more input devices 130 may include one or more mechanisms that permit an operator to input information to computing device 105, such as, but not limited to, a touch pad, dial, click wheel, scroll wheel, touch screen, one or more buttons (e.g., a keyboard), mouse, controller, track ball, microphone, camera, proximity sensor, light detector, motion sensors, biometric sensor, and combinations thereof. The one or more output devices 135 may include one or more mechanisms that output information to an operator, such as, but not limited to, audio speakers, headphones, audio line-outs, visual displays, antennas, infrared ports, tactile feedback, printers, or combinations thereof.

The communication interface 140 may include any, e.g., network interface, network adapter, modem, or combinations thereof, etc., that enables the computing device 105 to communicate with remote devices or systems, such as a mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

As discussed herein, the computing system 100 may be configured to provide any combination of the functions described herein, including those of which are described in the function components of any of the swim lane diagrams and/or any other block diagram or flow charts provided herein. In particular, computing device 105 may perform tasks (e.g., process, steps, methods and/or functionality) in response to the processor 115 executing program instructions contained in a computer readable medium, such as the system memory 125. The program instructions may be read into the system memory 125 from another computer readable medium, such as the data storage device 120, or from another device via the communication interface 140 or server within or outside of a cloud environment.

In embodiments, an operator may interact with the computing device 105 via the one or more input devices 130 and/or the one or more output devices 135 to facilitate performance of the tasks and/or realize the end results of such tasks in accordance with aspects of the present invention. In additional or alternative embodiments, hardwired circuitry may be used in place of or in combination with the program instructions to implement the tasks, e.g., steps, methods and/or functionality, consistent with the different aspects of the present invention. Thus, the steps, methods and/or functionality disclosed herein can be implemented in any combination of hardware circuitry and software.

FIG. 2 shows an exemplary cloud computing environment 200. The cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions and/or processes described herein may be performed and/or provided via cloud computing environment 200.

As depicted in FIG. 2, the cloud computing environment 200 includes cloud resources 205 that are made available to client devices 210 via a network 215, such as the Internet. The cloud resources 205 can include a variety of hardware and/or software computing resources, such as servers, databases, storage, networks, applications, and platforms. The cloud resources 205 may be on a single network or a distributed network. The cloud resources 205 may be distributed across multiple cloud computing systems and/or individual network enabled computing devices. The client devices 210 may comprise any suitable type of network-enabled computing device, such as servers, desktop computers, laptop computers, handheld computers (e.g., smartphones, tablet computers), set top boxes, and network-enabled hard drives. The cloud resources 205 are typically provided and maintained by a service provider so that a client does not need to maintain resources on a local client device 210. In embodiments, the cloud resources 205 may include one or more computing system 100 of FIG. 1 that is specifically adapted to perform one or more of the functions and/or processes described herein.

The cloud computing environment 200 may be configured such that the cloud resources 205 provide computing resources to client devices 210 through a variety of service models, such as Software as a Service (SaaS), Platforms as a service (PaaS), Infrastructure as a Service (IaaS), and/or any other cloud service models. The cloud resources 205 may be configured, in some cases, to provide multiple service models to a client device 210. For example, the cloud resources 205 can provide both SaaS and IaaS to a client device 210. The cloud resources 205 may be configured, in some cases, to provide different service models to different client devices 210. For example, the cloud resources 205 can provide SaaS to a first client device 210 and PaaS to a second client device 210. The client devices can be, e.g., a brokerage platform and/or the architecture shown in FIG. 3, amongst other clients.

The cloud resources 205 may be configured to provide a variety of functionality that involves user interaction. Accordingly, a user interface (UI) can be provided for communicating with cloud resources 205 and/or performing tasks associated with cloud resources 205. The UI can be accessed via a client device 210 in communication with cloud resources 205. The UI can be configured to operate in a variety of client modes, including a fat client mode, a thin client mode, or a hybrid client mode, depending on the storage and processing capabilities of cloud resources 205 and/or client device 210. Therefore, a UI can be implemented as a standalone application operating at the client device in some embodiments. In other embodiments, a web browser-based portal can be used to provide the UI. Any other configuration to access cloud resources 205 can also be used in various implementations.

The cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

One or more cloud resources 205 may be conceptually structured in multiple layers. In one example, the layers include a firmware and hardware layer, a kernel layer, an infrastructure service layer, a platform service layer, and an application service layer. The firmware and hardware layer may be the lowest layer upon which the other layers are built, and may include generic contributing nodes (e.g., data centers, computers, and storage devices) geographically distributed across the Internet and provide the physical resources for implementing the upper layers of the cloud service provider. The kernel layer is above the firmware and hardware layer and may include an operating system and/or virtual machine manager that host the cloud infrastructure services. The kernel layer controls and communicates with the underlying firmware and hardware layer through one or more hardware/firmware-level application programming interfaces (APIs). The infrastructure service layer is above the kernel layer and may include virtualized resources, such as virtual machines, virtual storage (e.g., virtual disks), virtual network appliances (e.g., firewalls), and so on. The infrastructure service layer may also include virtualized services, such as database services, networking services, file system services, web hosting services, load balancing services, message queue services, map services, e-mail services, and so on. The platform service layer is above the infrastructure service layer and may include platforms and application frameworks that provide platform services, such as an environment for running virtual machines or a framework for developing and launching a particular type of software application. The application service layer is above the platform service layer and may include a software application installed on one or more virtual machines or deployed in an application framework in the platform service layer. The software application can also communicate with one or more infrastructure service components (e.g., firewalls, databases, web servers, etc.) in the infrastructure service layer.

In another example, one or more cloud resources 205 may be conceptually structured in functional abstraction layers including a hardware and software layer, a virtualization layer, a management layer, and a workloads layer. The hardware and software layer may include hardware and software components such as mainframes, RISC (reduced instruction set computer) architecture based servers, storage devices, networks and networking components, application server software, and database software. The virtualization layer may include virtual entities such as virtual servers, virtual storage, virtual networks, virtual applications, and virtual clients. The management layer may provide functions such as resource provisioning, metering and pricing, security, user portals, service level management, and service level agreement planning and fulfillment. The workloads layer may provide functions for which the cloud computing environment is utilized, such as mapping and navigation, software development and lifecycle management, data analytics and processing, and transaction processing.

In embodiments, software and/or hardware that performs one or more of the aspects, functions and/or processes described herein may be accessed and/or utilized by a client (e.g., an enterprise or an end user) as one or more of an SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment.

Moreover, it is understood that although this disclosure includes a description on cloud computing, implementation of the teachings recited herein are not limited to a cloud computing environment. Rather, embodiments of the present invention are capable of being implemented in conjunction with any other type of computing environment now known or later developed. For example, the platform can implement resource pooling in which the provider's computing resources are pooled to serve multiple consumers using a multi-tenant model, with different physical and virtual resources dynamically assigned and reassigned according to demand. Moreover, the platform has rapid elasticity capabilities which enable the platform to be rapidly and elastically provisioned, in some cases automatically, to scale out and rapidly released to quickly scale in. The platform may also be implemented in different service models including, Software as a Service (SaaS), Platform as a Service (PaaS) and Infrastructure as a Service (IaaS). The cloud implementation can be deployed on a private cloud, community cloud, public cloud or a hybrid cloud as is known in the art.

Architectural Environment

The block diagrams in the Figures illustrate the architecture, functionality, and operation of possible implementations of systems, methods, and computer program products according to various embodiments. In this regard, each block in the block diagrams may represent a module, segment, or portion of instructions, which comprises one or more executable instructions for implementing the specified logical function(s). In implementations, the functions noted in the blocks may occur out of the order, depending upon the functionality involved. It will also be noted that each block of the block diagrams, and combinations of blocks in the block diagrams and/or flowchart illustration, can be implemented by special purpose hardware-based systems that perform the specified functions or acts or carry out combinations of special purpose hardware and computer instructions such as shown in FIG. 1.

Figure 3:
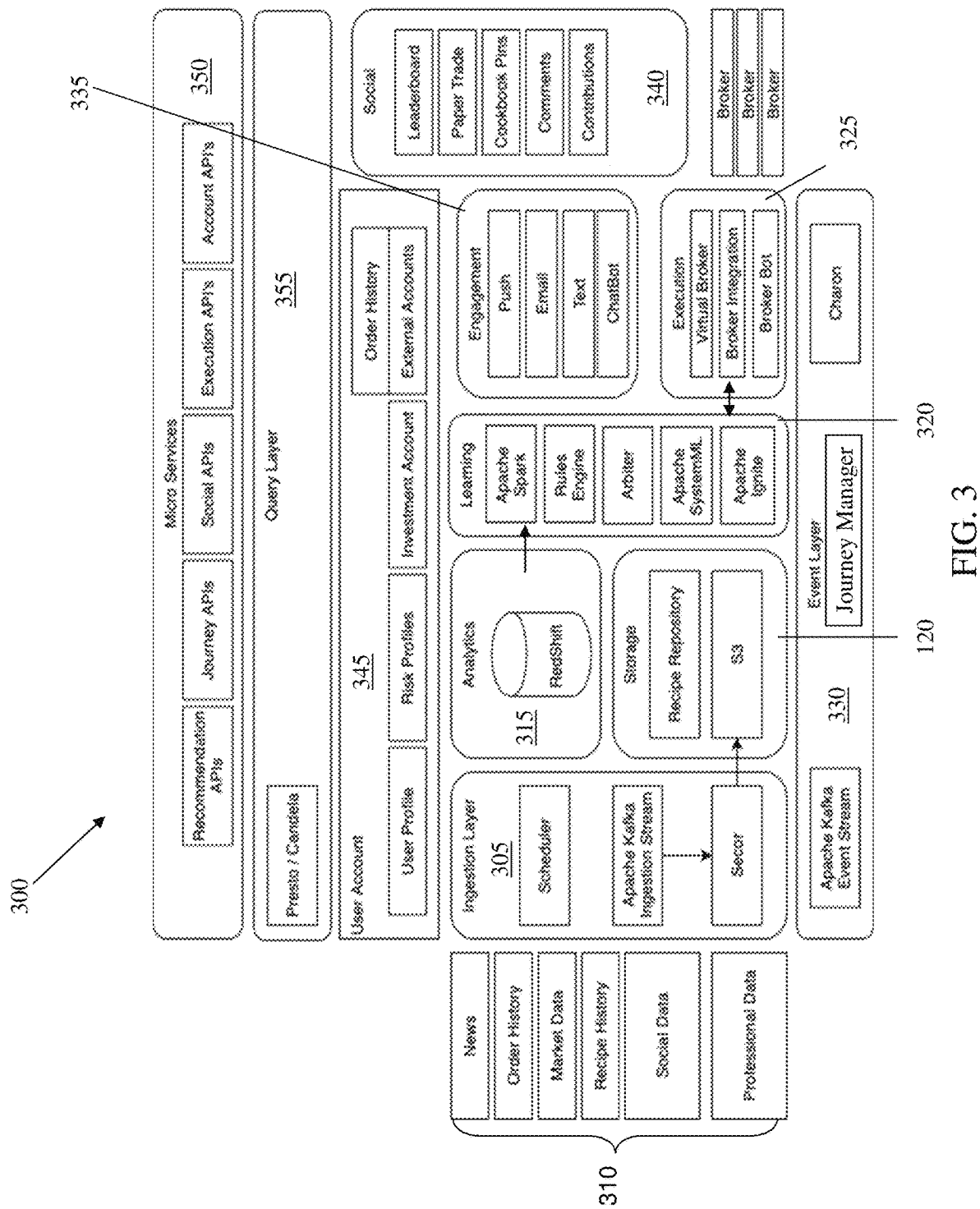
FIG. 3 depicts an architectural environment which can be implemented in the computing system of FIG. 1 and the cloud computing environment of FIG. 2, according to aspects of the present disclosure.

More specifically, FIG. 3 depicts an architectural environment which can be implemented in the computing system 100 of FIG. 1 and/or the cloud computing environment of FIG. 2. Generally speaking and as described in greater detail herein, by using the architectural environment of FIG. 3, an investor can interact with the systems and processes described herein, which uses a series of micro-services that easily integrate across mobile, web, chat or other emerging channels. The architectural environment shown in FIG. 3 will generate preconfigured trading recipes consisting of prepackaged opportunities based on investor profile, investor or other sentiment, and other data analytics described herein. The architectural environment will allow the investor browse the trading recipes, while also tracking the user's current interactions in order to further refine or to tailor trading recipes to a current session based on factors described herein. The architectural environment will also allow the user to execute real and virtual trading opportunities based on a number of different scenarios provided in the prepackaged trading recipes.

In embodiments, the architectural environment 300 includes the following components. And, as already noted herein, each of the following components can be a separate "engine" or a combination of engines that execute upon the functionality provided herein and particularly those shown in the architecture of FIG. 3.

Ingestion Layer 305

The ingestion layer 305 is an ingestion engine which allows the entire solution (trading platform) to effectively ingest large amounts of data 310 at scale. For example, the ingestion layer 305 is used to intake and move data into storage, e.g., storage system 120, at scale. This data is obtained from content feeds 310 such as, for example, news, order history (of one or more users), market data, recipe history (as further described herein), social data (social feeds, e.g., Twitter®, Facebook®, MotleyFool®, etc.,) and processional data, amongst other data types, in addition to or optionally any data described in the section entitled "OVERVIEW OF SYSTEM AND PROCESSES (TRADING PLATFORM)". Additional data may include sentiment, as described herein.

In a specific embodiment, the ingestion layer 305 implements open source processing systems such as Apache Kafka to build real-time data pipe lines and streaming applications in accordance with aspects of the present disclosure. (Kafka is a registered trademark of The Apache Software Foundation at least in the United States.) Kafka is an open-source stream-processing software platform written in Scala and Java; although other languages are also contemplated herein as already described above. In embodiments, the processes and systems described herein, including Kafka, are horizontally scalable and fault-tolerant. Moreover, the platform aims to provide a unified, high-throughput, low-latency platform for handling real-time data feeds.

In implementation, the ingestion layer 305 using Kafka, for example, ingests streams of data received from the content feeds 310, e.g., market data, social data, etc., obtained from the web or other sources at scale. The content feed 310 can also include user provided data, in which the user can execute as contributors by providing additional comments or ratings on an opportunity or creating variations of underlying recipes that act on the same underlying stock or other trades, but uses different parameters to modify the risk/reward of the original trading recipe or could also modify the trading recipe to increase in value of the underlying stock moves in the opposite direction assumed in the original recipe. In these latter scenarios, the user can be an opportunity creator, which assists the intelligent opportunity creator (e.g., artificial intelligence).

In embodiments, the artificial intelligence, e.g., Kafka, can also serve as an event engine where learning systems, such as Apache SystemML® and PredictionIO® can subscribe to incoming streams (e.g., content feeds 310) to trigger recipe events based on learning rules, as should be understood by those of ordinary skill in the art such that no further explanation. For example, Apache SystemML provides a workplace for machine learning using big data, where it automatically scales data. PredictionIO is used to create predictive engines for any machine learning task such as trends, notifications and opportunities in order to create and/or generate the trading recipes comprising a host of different complex trading opportunities based on the external and internal factors described herein.

As specifically noted at https://predictionio.apache.org/, PredictionIO allows a developer/program platform to:
quickly build and deploy an engine as a web service on production with customizable templates;
respond to dynamic queries in real-time once deployed as a web service;
evaluate and tune multiple engine variants systematically;
unify data from multiple platforms in batch or in real-time for comprehensive predictive analytics;
speed up machine learning modeling with systematic processes and pre-built evaluation measures;
support machine learning and data processing libraries such as Spark MLLib and OpenNLP;
implement your own machine learning models and seamlessly incorporate them into your engine;
simplify data infrastructure management.

The streamed data can be moved to scalable/persistent long term storage on, for example, a simple Storage Service (e.g., S3) or other storage device as shown in FIG. 1, e.g., storage device 120. The storage device also can store other information such as the trading recipes (i.e., opportunities which are packaged in a certain manner by the AI or modified by an opportunity creator).

This movement of data can be provided by Secor. The Secor also allows the data to be further segmented at scale by, e.g., Apache Spark and Hadoop. It should be understood by those of skill in the art that data lost or corrupted at this stage is not recoverable so the greatest design objective for Secor is data integrity.

Scheduler allows for the pull ingestion of data when needed. Some data does not fire in events, but must be downloaded or requested from a provider. The scheduler provides the ability to pull data from, e.g., the content stream 310, web services, FTP, RSS or other feeds when needed.

Analytics 315

The analytics 315 serves multiple functions within the solution (i.e., trading platform) including providing statistical feedback on the data allowing the trading platform to provide quick access to graphs and trends on a user's current account as well as market data on stocks or other trading opportunities. For example, the analytics 315 can track trading recipe views, trading recipe success and trading recipe losses, at scale.

In embodiments, in the analytics 315, by way of one example, cloud data warehouse (i.e., RedShift) also allows the machine learning systems to view a past history of any particular trading recipe to understand why it was successful or unsuccessful. For instance, if a company was on a downward trend, but was suddenly gaining attention in the news and on social media for increased sales, increased visibility etc., the learning system can view past trading recipes that were successful and create new trading recipes based on viewing current streams (from Kafka) and reviewing past analytics from similar or other positions.

Storage 120

The storage 120 ingests vast amounts of data at scale. For example, the storage 120 is used to store the trading recipes (prepackaged trading opportunities generated by the systems and processes) that an investor can browse and execute. The storage 120 includes a recipe and/or opportunity repository which serves as the holding point for current trading recipes created by contributors, opportunity creators and/or the machine learning systems (AI). Also, the data from the content feed 310 can be easily ingested and stored in the storage using, e.g., Apache Spark and Hadoop, for indexing.

Machine Learning 320

The machine learning 320 is the intelligent opportunity creator that continuously rates, ranks opportunities based on integration of various sentiments and other relevant data (using machine learning) from the data feeds 310, and uses this information to generate different trading recipes of the opportunities. The machine learning 320 provides machine learning at scale as vast amount of data will come in quickly. In this way, the machine learning 320 provides a solution to create trading recipes that are relevant to the investor as it contains scalable aspects for processing and interpreting data. For example, the machine learning 320 can access the analytics 315 and storage 120 to generate and propose new trading recipes based on past history of a commodity, as well as current trends, sentiments, etc., while applying proven investment patterns as trading recipes that are stored in the storage 120. The machine learning 320 can also create the trading recipes by analyzing many other factors including, (i) at order history of current investors and recommend options based on trends, and analysis and integration of the different data from the content feeds 310 amongst other functionality described herein.

The machine learning 320 can also use sentiment analysis, which is a contextual mining of text that identifies and extracts subjective information in source material, and which helps to understand the social sentiment of a brand, product or service while monitoring online conversations. This can be accomplished using Self Organizing Fuzzy Neural Networks (SOFNN) as is known in the art. See, also, e.g., Shashank Gupta, Sentiment Analysis: Concept, Analysis and Applications, Jan. 7, 2018 (https://towardsdatascience.com/sentiment-analysis-concept-analysis-and-applications-6c94d6f58c17) and Khan Saad Bin Hasan, Stock Prediction Using Twitter Ever wondered if you could predict the stock market what you can do?, Jan. 3, 2019 (https://towardsdatascience.com/stock-prediction-using-twittere432b35e14bd?gi=cc7bead1311e.)

In embodiments, the sentiment analysis is carried out by the machine learning 320 performed, e.g., for the overall market, a specific stock/commodity and social sentiment about the stock. The machine learning 320 can also be used to produce positive, negative and neutral sentiments for each stock/commodity or sector, in combination with more factually based market data such as price trends and other objective evidence of market concern, e.g., sales, Earnings before interest, tax, depreciation and amortization (EBITDA), etc.

In embodiments, the sentiment can be computed by looking for words that are written about the particular trading position, e.g., management or how people on social media speak positively or negatively about the company. The sentiment can even be presented to the user, prior to incorporating into the analysis, to determine whether the particular user is in agreement or not in agreement with the sentiment. During the ingestion of data from the content feed 310, e.g., news, social data, professional data and market data, different sentiments for each factor can be established and used to understanding how people, the market and professionals think about a stock/sector etc.

In operation, the machine learning 320 can implement Apache Spark to process and split data into smaller sets, add new partitions for storage and process a first level of analytics on incoming data, as well as provide a base level of machine learning algorithms such as alternating least squares for recommendations. The analytics includes looking for trends, analyzing prices and other complex trades, and collating of data received in the content feed 310, to develop trading recipes consisting of prepackaged trading opportunities.

In addition, Apache SystemML can be used to provide the workplace for machine learning using the big data. The SystemML can be run on top of Apache Spark, where it automatically scales data, line by line, determining whether code should be run on the driver or an Apache Spark cluster, as an example. In the present disclosure, SystemML can provide learning algorithms that run across multiple datasets. SystemML can also compare past history of recipes and their success or failure along with a user's profile information, including investment types, sectors, risk etc. to determine if a user should be recommended a specific recipe. It is understood, though, that other machine learning algorithms can be used to provide the functionality herein, including neural networks, etc.

In further embodiments, the machine learning 320 can use System ML beyond the act of a typical recommendation engine by creating new trading recipes based of past analytics stored on trading recipes that were successful or failed, as well as the risk level initially assigned to the user or as dynamically determined by the systems and processes based on the investors past transactions, past and current research, etc. Moreover, the systems and processes herein using, e.g., System ML and PredictionIO, can look at the data feeds 310, e.g., social media, market trends and news data, to determine similarities with past spikes and create new trading recipes based on a set of common patterns to offer new trading recipes to a community. The machine learning 320 can also implement Apache Ignite to provide a constant learning system for machine learning using scalable, in memory solutions for solving complex data problems, including money management and other complex trading opportunities as described herein.

In further embodiments, an arbiter can be used with the rules engine in rating as well as holding interrelationships between sectors and commodities. In embodiments, the arbiter can be a central gateway to new opportunities and provide analysis as to whether certain information should be considered for generation of a trading recipe. In addition, the arbiter can maintain posting rules, for instance, the arbiter may exclude certain industries, stocks or currencies to keep them from being posted as opportunities.

For example, in embodiments, the arbiter can take results from multiple algorithms and make an overall decision based on all the algorithms that are run on the platform. In this way, the arbiter can be an overall decision maker. And, the arbiter is an artificial intelligence pattern, but it is important to note that the overall platform has a mechanism (e.g., arbiter) for looking at and over all artificial intelligence processes and rules running on the platform and, taking all of them into account, make a larger decision as to a possible trade, etc. In this way, the arbiter can also post opportunities as premium based on rules that can be easily changed in the arbiter using the rules engine. The arbiter can also use the combination of sentiments to determine if it needs to look for upside/positive plays, negative plays or plays that keep the stock running in a neutral area, such as a spread play. For instance, the social sentiment, market sentiment, sentiment about the management and professional sentiment on a stock are positive, the arbiter will hypothesize that the stock is going up and look for recipes that promote the stock/commodity moving up.

The arbiter can also be used to search and filter trading recipes based on a user's past purchase history, risk level, sectors of interest, favorite contributors, bull runs, bear runs, spread plays, short sells, and other factors. In this case, an arbiter can take into account multiple factors from the user account, including order history and risk profile to look at what recommendations to make to the trader based on genetic algorithms and recommendation algorithms like alternating least squares (ALS). In addition, just as with creation patterns, the arbiter can be used to search for recommendations over multiple algorithms, find similar recipes or recipes that fit a user's profile and return them back to the user as possible recipes to execute, etc.

In further embodiments, the machine learning 120 using, e.g., the rules engines, can provide a risk profile. For example, the machine learning 120 can assigned a trading recipe a risk rating of very low, low, medium, high, extremely high, speculative, to each opportunity or the set of opportunities in the trading recipe. Similarly, the machine learning 120 can assess the trading habits of the investor and assign a risk profile rating to the investor. In this way, each trade and each investor can be assigned a numeric value associated with risk. When a user executes a trade, a risk profile engine can adjust the user's risk profile by the numeric value of the trade using the following formula. The machine learning 120 can then use the risk ratings to match the preconfigured recipe with the risk tolerance of the investor.

Execution Layer 325

The execution layer 325 includes a broker integration component which allows users to integrate the trading platform described herein with their external brokerage account at a traditional online stock broker. This allows the trading platform described herein to invoke the APIs of the external online stock broker's platform to execute stock trading actions on behalf of the user. By way of example, the API is a set of programming code that queries data, parses responses, and sends instructions between one software platform, i.e., system and process for simplifying stock market based investments, and another, i.e., brokerage.

In the context of trading, the user will invoke an API to establish a connection between a set of automated trading algorithms and the trader's preferred trading broker platform for the purpose of obtaining real-time pricing data and place trades. These actions can be options, commodity purchases, derivatives, swaps, shorts, call options, futures, exchange traded funds, etc. and/or, interestingly, any combination of any of these different trading schemes by a single user or a community of users as described herein. As to the latter feature, the systems and processes described herein create different investment recipes and/or seeks a single user or a community of users to purchase a "mutual type fund" of disparate instruments based on risk factors of the individual or community.

The execution layer 325 also includes a virtual brokerage component which provides the ability for a user to execute opportunities using an account with virtual currency with no monetary value. This virtual brokerage account can be provided directly in the trading platform or can be provided via the brokerage component when connecting to a 3rd party online brokerage that offers virtual trading.

The execution layer 325 also includes bots (e.g., as described in the section entitled "OVERVIEW OF SYSTEM AND PROCESSES (TRADING PLATFORM)". These bots can be a brokerage bot working together with the arbiter spot new opportunities, and submit these opportunities to the arbiter (or intelligent opportunity creator) to generate new trading recipes or modify already existing trading recipes. More specifically, the brokerage bots work to spot new opportunities and, in embodiments, list possible opportunities to the arbiter. The brokerage bots can post opportunities as premium based on rules that can be easily changed in the arbiter using a rules engine. The brokerage bots can also look at trends (e.g., trending bots) and, more specifically, what users are viewing for opportunities as well as what users are buying as opportunities for recommendation purposes. The brokerage bot can make recommendation based current charting trends, news and other factors that can be filtered by the bot.

Event Layer 330

The event layer 330 is used to track user's current interactions, amongst other functionality. In more specific embodiments, the event layer 330 provides a scalable solution for quickly creating recommendations for a user by working in conjunction with the machine learning 320, e.g., Apache Spark, to create recommendations based on how users are leveraging their journeys, i.e., the event stream. For example, the streaming engine (e.g., Apache Kafka Event Stream) allows the machine learning 320, e.g., Apache Spark or other engine, to process single user event data, as well as quickly respond to larger buying trends by using the same entry point for all user journeys.

The event layer 330 further includes a guide manager. The guide manager (e.g., Charon) is a scalable, serverless tracker that maintains a history of what a user is looking at during a session to help tailor interest to a specific risk level, sector or commodity for the user's session and, by using this additional information, allow the machine learning 320 to generate or modify a preconfigured trading recipe. In embodiments, the guide manager will help recognize changes in the user's regular patterns and can adjust a user's trading session to account for this change by feeding opportunities based on the change in behavior. For example, the user may typically trade in the tech sector, but suddenly starts looking at utilities, the guide manager will recognize this change and will understand quickly how the user is looking to trade in the new sector in order to display opportunities that meet their risk level and sector.

The event layer 330 further includes a security layer. The security layer will protect mobile communications from surveillance, hacking, and interception. In addition, the security layer can detect mobile network interception, as well as protect sensitive files such as proprietary information. Any type of security layer can be implemented with the trading platform and communication between a brokerage account and the user. For example, encryption software, as well as network guards, spectrum guards and/or hardware-based secure VPN connectivity can be implemented within aspects of the present invention. The different security protocols can be implemented by those of ordinary skill in the art without any further discussion.

Engagement Layer 335

The engagement layer 335 is used to push information to the end user. This includes chatbots or notifications. The notifications can be pushed to the user by emails and SMS, as examples. The notification can be used to communicate the success or failure of a trade, amongst other communications, such as new trading recipes, brokerage information, etc.

Social Layer 340

The social layer 340 includes a leaderboard. In embodiments, the leaderboard tracks a list of most successful users and/or trading recipes over various periods of time such as weekly, monthly, quarterly and yearly (or other predetermined time period) based on the percentage gains they have achieved with their picks and executions of opportunities. The leaderboard also tracks a list of most successful opportunities based on the summation of gains of all users that executed that opportunity (e.g., execution of the opportunities through their selected trading recipes). The leaderboard also tracks a list of most successful opportunity creators based on the total gains of all the users that executed on opportunities created by that opportunity creator. The information from the leaderboard can be used by the AI to determine best practices, trends and different opportunities. The social layer 340 also includes the ability for any user of the system quickly mark an opportunity with their sentiment (positive, negative, neutral, etc.), comment on an opportunity, share it with other users, and other types of social interaction.

User Account 345

The user account 345 maintains a user repository including a profile, authentication data, preferences, account settings and history. For example, the user account 345 can maintain the profile the user such as name, ID, passwords, and other personal information. The user account 345 can also store investment account information, e.g., $3^{rd}$ party brokerages and other external account information, order history and risk profiles. In embodiments, the investment account information can, e.g., name, ID, passwords, and other account information. The risk profile can include a static or dynamic risk profile. The static risk profile can be obtained from the investment account information; whereas, the dynamic risk profile can be obtained from the systems and processes described herein. The user account can also maintain a connection profile information for the virtual broker and an execution bot. In this way, in embodiments, the user account is the master repository for connecting the user to the various roles from an opportunity creator to a trader.

In implementation, when a user executes a trading recipe, their account information is retrieved from the user account layer 345 and the trading recipe is executed by the execution layer 325 against APIs exposed by third party, external brokers. Once executed, the order history is kept in the user account 345. Also, when an investor starts to browse current recipes, the user account layer 345 is used along with the machine learning 320 to suggest specific recipes stored in the storage layer to the investor.

Micro-Services Layer 350

The micro-services layer 350 provides a granular approach to surfacing Restful web services to end user channels. As the systems and processes described herein (e.g., trading platform) leverages an omni-channel approach to displaying and/or communicating information to the end user, e.g., investor, opportunity creator, etc., it is useful that the services can be easily ingested across mobile, web, chat or other emerging interface. The micro services layer 350 lets the developer, creator, etc., decide which channels to expose quickly without having to create a service logic layer for each channel.

Query Layer 355

The query layer 355 provides graphing and data visualizer to the end user. For example, the query layer 355 includes Candela which is an open-source suite of interoperable web visualization components. The query layer, e.g., Candela, makes scalable, rich visualizations available with a normalized API for use in real-world data applications. See, e.g., Candela (https://candela.readthedocs.io/en/latest/, Copyright 2016, Kitware, Inc., Revision 51d7b2b9). It should be understood by those of skill in the art that the systems and processes described herein can also use other graphic tools for charting, graphing or providing other visualizations, e.g., recipes, using the data and analytics described herein, e.g., Query and visualize Presto database data with Holistics SQL editor and visualization tools.

Cookbooks and Trading Recipes

There is a considerable amount of information a user needs to understand before buying a contract or other complex trading opportunity (e.g., option to buy 100 shares of stock). For example, executing an options buying pattern is confusing since the user needs to understand the strike prices, the number of contracts available and filter the option based on time decay or how close to the money the option is. And, by receiving a recommendation for a specific play from an advisor over an email or trading engine, the suggested strike price may not be available to the investor when they go to execute the play (trades). Also, most trades consist of multiple purchases of buys and sells of calls and puts. This means the user actually needs to make multiple, manual trades at human speed to make sure they can execute their play.

In this example, the user of the trading platform does not need to understand the complexity of buying and selling options, commodities, derivatives, and/or other trading opportunities such as money exchanges, etc. The user simply reads about a particular trading recipe associated with, e.g., the Acme Beverage Company upcoming earnings call, and decides if they would like to invest by selecting between the various fixed trading recipe scenarios of +4%, +2%, −2% and −4% as generated, created and presented as an opportunity with execution recipes for each of the available scenarios by the systems and processes described herein.

The Trading Recipe

Figure 4:
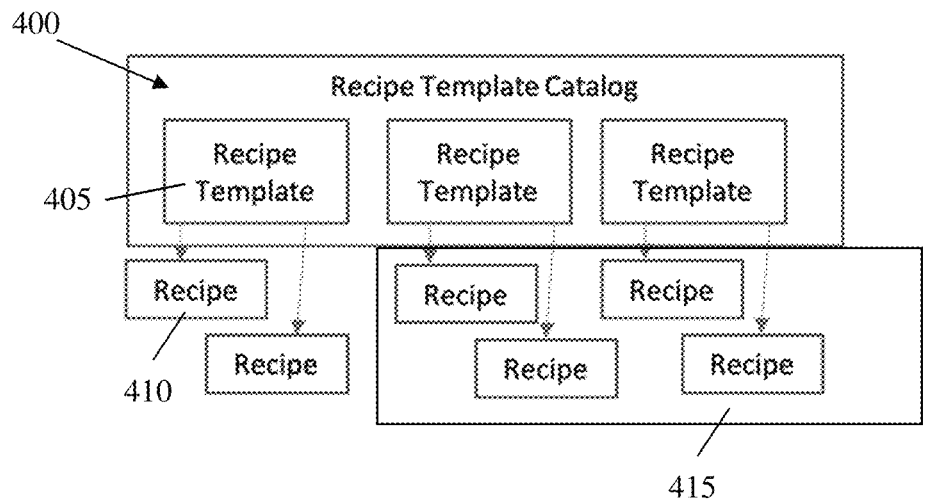
FIG. 4 shows a recipe template catalog and resulting recipes generated using the systems and processes according to aspects of the present disclosure.

In embodiments, the systems and processes described herein, e.g., trading platform, provide a recipe template catalog 400 as shown in FIG. 4. The recipe template catalog 400 can be generated by the architectural environment shown in FIG. 3.

In embodiments, the recipe template catalog 400 provides a guide or a template where the intelligent opportunity creator creates new opportunities or modifies existing opportunities in the form of a trading recipe. For example, a Bull Put Spread is an example of a stock options strategy to invest in the underlying stock with the outlook that it will increase in value. The strategy involves buying a Put Option at a certain level and then selling a Put Option at a higher level. In addition to these two Put Option prices, the user also needs to know the options expiration date and the limit price for buying or selling the options. It may also be necessary to know the stop price where the investment should be automatically liquidated because the investment is going in the wrong direction. Other Options strategies such as Iron Condor or Butterfly Spreads require addition parameters. As complex as these trades can be, the trading recipe templates will capture these different types of strategies along with the required parameters for execution by the investor. This simplifies the execution strategies of the investor by using a single trading recipe that can be executed with a single action because all the steps are included in the trading recipe. In addition, the trading recipe can be provided in different risk profiles for the same type or kind of trade, thereby allowing the investor to best match their risk tolerance with a specific opportunity using a single trading recipe.

Referring again to FIG. 4, the recipe template catalog 400 includes multiple recipe templates 405 each of which may represent a complex investing strategy comprising different opportunities. For example, some templates are regular trading patterns known in the industry, but other templates are customized templates to simplify investments strategies into the trading recipes as generating using the many external and internal factors described herein. The recipe template catalog 405 can store the recipe templates 405 which are used to create trading recipes 410, 415. The recipe template catalog 405, recipe templates 405 and trading recipes 410, 415 can be stored in the storage system 120 (e.g., opportunity registry) of FIG. 1.

Once the recipe template 405 is completed with specific parameters of the investment then a new trading recipe 410 can be created which is executable by multiple users. For example, in embodiments, users of the platform view the created trading recipes as part of prepackaged trading opportunities which can comprise one or more series of complex trades, where the underlying recipe 410 is how the creator recommends executing on that opportunity. The trading recipes 410 can be viewed on a display using, e.g., query layer 355, shown in FIG. 4, and then executed upon using the architectural platform of FIG. 3. The user can view and even modify the trading recipe, if desired, before executing on the opportunity. Once the trading recipe is executed, (e.g., using the execution layer 325 of FIG. 3, it will be transmitted to the brokerage account and executed as an investment for the user.

In embodiments, the intelligent opportunity creator that creates the different recipes is artificial intelligence as described in the section entitled "OVERVIEW OF SYSTEM AND PROCESSES (TRADING PLATFORM)", and which uses the architectural environment as described with respect to FIG. 3. Moreover, any user can act as a creator by creating or modifying trading recipes which are then consumed or executed by the investor. The investor, for example, can also execute as creators by providing additional comments or ratings on an opportunity or creating variations of the underlying trading recipes that act on the same underlying stock or other trades, but uses different parameters to modify the risk/reward of the original recipe or could also modify the recipe to only increase in value of the underlying stock moves in the opposite direction assumed in the original recipe.

In exemplary cases, a trading recipe 410 can be any type of trading type. For example, a trading recipe 410 can be used with Call Options and Put Options to leverage the amount of money used when executing the trading plan associated with the recipe. This enables the user to use a smaller monetary investment in the trading recipe 410 and receive a larger gain on that amount compared to the movement of the underlying stock value. For example, the user could execute a recipe using $100 and double that amount if the expected outcome occurs even though the underlying stock only goes up by a single digit percentage gain.

In embodiments, as users interact with the system, the users can change personas between creator, contributor and consumer of opportunities, i.e., traders. Also the trading recipe variations can occur after the trading recipe 410 has been executed and is an active and open investment. For example, an executed trading recipe may have included an automated exit at 50% gain. The creator of the trading recipe 140 or another contributor can update the trading recipe 410 or create a recipe variation to modify certain characteristics of the trade that is currently active.

In embodiments, the trading recipes 410 can be organized into one or more cookbooks 415. For example, the cookbooks 415 can be created with trading recipes that are high risk, low risk, bullish, bearish, or based on types of investments such as technology, medical, commodities, currency valuations, etc. This allows users, i.e., creators, traders, etc., to subscribe to a specific cookbooks of interest in order to expedite finding of certain types of trading recipes.

Example Interfaces of Trading Recipes

Figure 5:
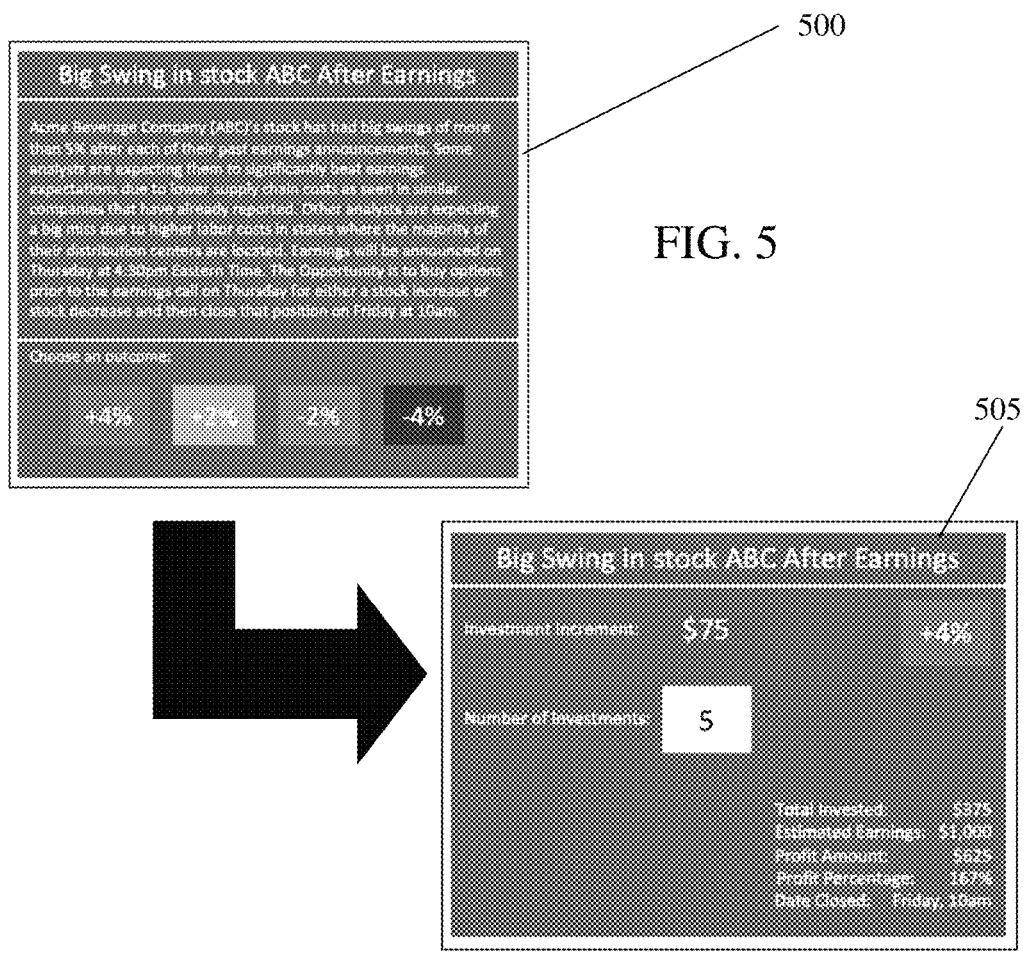
FIG. 5 is a non-limiting illustrative recipe (suggested investment opportunity with underlying recipe for execution) using the systems and processes according to aspects of the present disclosure.

An example trading recipe is shown in FIG. 5. It should be understood by those of ordinary skill in the art that the interface, e.g., as implemented in the computing infrastructure of FIG. 1, can be provided by as a standalone system or implemented directly into a brokerage account. Also, the interface, which can be any graphical user interface, can be implemented in a mobile device or other computing system. Moreover, the interface can be provided by the query layer 355, as a non-limiting illustrative example, of FIG. 3. It is further understood that the trading recipe of FIG. 5 is only one type of scenario using securities, and that similar information can be provided for other trades, e.g., futures, derivatives, commodities or other types of trades. And, by provided the trading recipe as described herein, the user no longer needs to understand the complexity of buying and selling options, commodities and/or other trading opportunities.

In the example of FIG. 5, stock options are used; although examples are applicable to other trading strategies as should be understood by those of skill in the art. In any event, with options, the amount of money required to execute on the opportunity is much lower and the amount of gain is much higher. The difference is that the price paid for the option is not recouped and has to be subtracted from the gains to calculate the profit. Buying stock options is done by buying 'contracts' which is the agreement to buy or sell a stock at a specific price.

In FIG. 5, the interface 500 shows the following textual display, where the investor can select a desired outcome of +4%, +2%, −2% or −4% based on risk tolerance.

Big Swing in Stock ABC after Earnings

Acme Beverage Company (ABC)'s stock is currently trading at $100 per share and has had big swings of more than 5% after each of their past earnings announcements. Some analysts are expecting them to significantly beat earnings expectations due to lower supply chain costs as seen in similar companies that have already reported. Other analysts are expecting a big miss due to higher labor costs in states where the majority of their distribution centers are located. Earnings will be announced on Thursday at 4:30 pm Eastern Time. The Opportunity is to buy options prior to the earnings call on Thursday for either a stock increase or stock decrease and then close that position on Friday at 10 am.

The user (investor) can select a desired outcome of +4%, +2%, −2% or −4% based on risk tolerance. By selecting the desired outcome, the systems and processes will then provide a trade execution display based on the selected trading recipe as generated by the systems and processes described herein, with particular information required by the user, e.g., number of investments.

The trading recipe shown in FIG. 5 is based on a +4% desired outcome, e.g., high risk. More specifically, the trading recipe 500 includes:

RECIPE 1: Opportunity Fixed Execution 1—Stock Increase of 4+% after earnings

Trade: Stock ABC is currently trading at 100 dollars per share. This trade will buy a Call Option with a strike price of $102 that expires on Friday at a cost of $0.75 for the Call Option expecting the stock will jump to $104. Each $75 invested for a set of 100 contracts will be valued at $200 for a profit of $125 (167%) after subtracting the price of the options contracts.

Formulas:

$$((<\text{Current Stock Value}>-<\text{Option Strike Price}>)\\ *<\text{Number of Contracts}>)-\text{Price for Options})=\\ \text{Profit}$$

$$(($104-$102)*100)-$75=$125$$

Profit/Cost=Percentage Gain $$$167/$75=167\%$$

It should be understood, though, that the investor can also select the other risk tolerant trades, which are generated into different trading recipes for execution by the investor. By way of example:

RECIPE 2: Opportunity Fixed Execution 2—Stock Increase of 2+% after earnings

Trade: Stock ABC is currently trading at 100 dollars per share. This trade will buy a Call Option with a strike price of $101 that expires on Friday at a cost of $0.90 for the Call Option expecting the stock will jump to $102. Each $90 invested will return $100 for a profit of $10 (11%).

RECIPE 3: Opportunity Fixed Execution 3—Stock Decrease of 2+% after earnings

Trade: Stock ABC is currently trading at 100 dollars per share. This trade will buy a Put Option with a strike price of $99 that expires on Friday at a cost of $0.87 for the Put Option expecting the stock will drop to $98. Each $87 invested will return $100 for a profit of $13 (15%).

RECIPE 4: Opportunity Fixed Execution 4—Stock Decrease of 4+% after earnings

Trade: Stock ABC is currently trading at 100 dollars per share. This trade will buy a Put Option with a strike price of $98 that expires on Friday at a cost of $0.79 for the Put Option expecting the stock will drop to $96. Each $79 invested will return $200 for a profit of $121 (153%).

In this example, the user does not need to understand the complexity of buying and selling options, commodities, derivatives, and/or other trading opportunities such as money exchanges, etc. The user simply reads about the opportunity associated with, e.g., the Acme Beverage Company upcoming earnings call, and decides if they would like to invest and chooses between the various fixed recipe scenarios of +4%, +2%, −2% and −4%. Once the selection is made, an execution bot will execute the specified options trades via the broker integration component of the execution layer 325, as soon as the user makes their selection. The execution bot will update the user's account with the status of the trade while it is active and then close it at the configured time based on the recipe execution plan. Each recipe is displayed to users in a simple format allowing them to quickly review the details of the recipe and make their selection on their expectation of the outcome.

Referring still to FIGS. 3, 4 and 5, one or many uses of the recipe templates and collection of completed recipes in a user's one or more cookbooks is to provide input for the machine learning system to produce new recipes as shown in FIGS. 4 and 5. The machine learning 320 uses user patterns, data from the content feeds 310, and templates for creating trading recipes. The machine learning 320 is further configured and structured to provide recipes based on, e.g., (i) values entering into the templates to create actionable recipes, (ii) what recipes are popular and being executed the most, and (iii) which recipes are being successful at generating gains, etc.

In embodiments, the machine learning 320 needs to only understand when to apply a specific pattern for a given situation. For instance, if the machine learning 320 determines that there is a good chance (e.g., greater than 50%) a stock is going up in the near future based on current market trends, social media traffic and past stock trends for a specific stock, then the machine learning 320, acting as the intelligent opportunity creator, can use a template to generate various opportunities based on this outcome. As the machine learning 320 improves, it may pull past recipes and reuse them, just as it would a template in the cookbook.

Creating a Trading Recipe

A trading recipe is a complex process due to the fact that data needs to be constantly ingested by the trading platform. The systems and processes manage this ingestion by scaling the ingest of data from various sources into the trading platform. Once this is ingested, it can be used by the machine learning 320 using, e.g., past history of commodities, market movements, past recipe data, investor sentiment, and even past user account data to create the trading recipe, using the architecture as already described in FIG. 3 and the systems shown in FIGS. 1 and 2, as examples.

Figure 6:
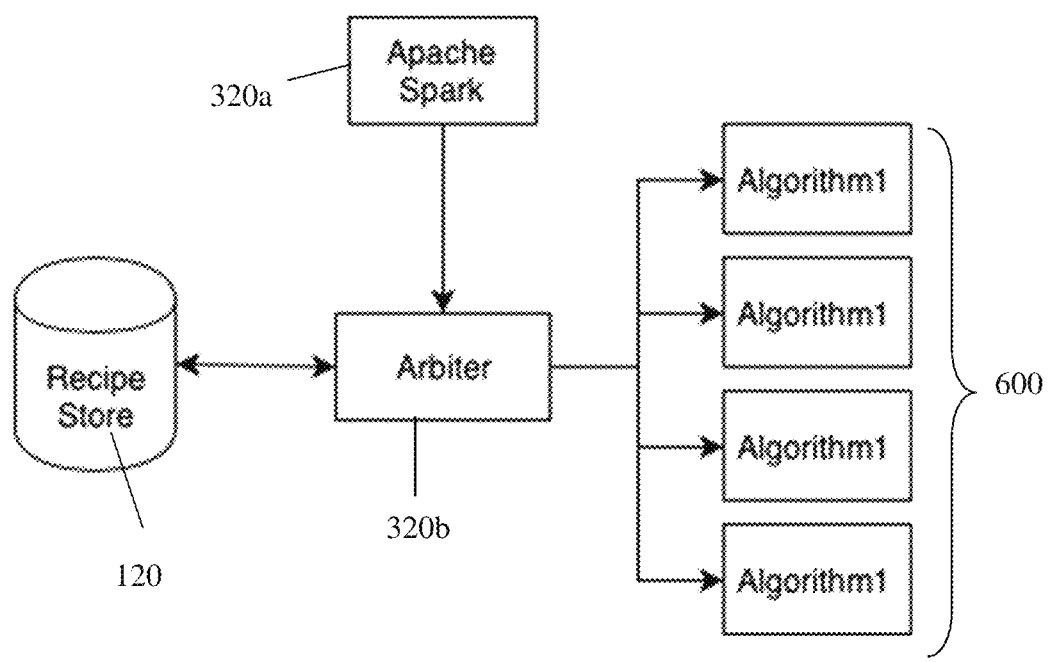
FIG. 6 shows a subset of components shown in FIG. 3 and their interactions in accordance with aspects of the present disclosure.

FIG. 6 shows a subset of components shown in FIG. 3 and their interactions in accordance with aspects of the present disclosure. More specifically, FIG. 3 shows the arbiter 320b of the machine learning component 320 reacting to increased traffic from a stream, where the arbiter notices increased traffic from Apache Spark 320a (machine learning) during processing of incoming data (e.g., from the content feed 310). In embodiments, the arbiter 320b will fire off multiple "workers" (e.g., bots) to apply the different algorithms 600 to the trading recipe. By way of example, each algorithm can return a score by running through a neural net, and the raw output from the final runs of the neural net is a confidence score that can be used (can be a percentage of confidence) by the arbiter with other scores from algorithms to determine if a trade is necessary (as described in detail herein, where reference can be made to FIGS. 13 and 14, amongst other descriptions herein).

When the arbiter 320b notices high traffic for a particular stock, high activity or cost for certain options on a stock, or other types of trades, as an example, it sends a request to run the algorithms 600 for that particular trade and rate the responses to determine the best trading recipes. In embodiments, each algorithm 600 returns a score for how likely it thinks a recipe or recipes will be effective as shown, e.g., in FIGS. 13 and 14. The arbiter 320b can take the ratings and choose one more recipes to apply.

By way of example, following the idea of a particular stock associated with company "X" example, the arbiter 320b detects that there is a lot of traffic for the company "X" in the news and via the market. The overall news sentiment is determined to be positive, with the stock trending positive. In this example, the arbiter 320 wants to determine the best recipe to offer the user of the trading platform.

In this case the machine learning 320 leverages Apache Ignite for genetic algorithms. In this system, each basic template in the cookbook is defined as a Gene. In a genetic algorithm, a gene is an optimal solution. Therefore, for each template, the machine learning defines when to optimally apply the options pattern or other pattern to the ingested data. A fitness score is used to determine how optimal the solution is relative to other potential solutions in the population.

The problem can be run using multiple genetic algorithms for each of the templates to determine which template should be applied to the problem by recommending the template with the highest fitness score. For instance, stock "X" is at $55. In this example, the social sentiment is positive and the news sentiment is positive. The machine learning 320, e.g., Apache Spark 320a, runs each of the positive play recipe's genetic algorithms for fitness. The fitness algorithm yields a score for each recipe, where each recipe can be run on its own and is independent of the others due to the fact that the trading platform described herein uses a distributed machine learning system. Once the arbiter 320b receives all the results, it can choose the best recipe or recipes based on the higher scores returned from each genetic algorithm ran.

In further embodiments, a creator (intelligent opportunity creator or the opportunity creator) could send a request to the arbiter 320b with a suggestion, e.g., stock "X" will increase in price. The arbiter 320b can run the genetic algorithms and suggest a particular trading recipe to the recipe creator as a starting point. This allows the creator to assist machine learning in cases where the creator may understand an aspect of a stock not understood by the trading platform, giving the creator insights while providing a best fit recipe if the stock does rise. In this case, the arbiter 320b returns a set of suggested trading recipes, and the opportunity creator or other user can accept, edit or reject them instead of them instantly being placed into the recipe store.

Tailoring Recommendations

Figure 7:
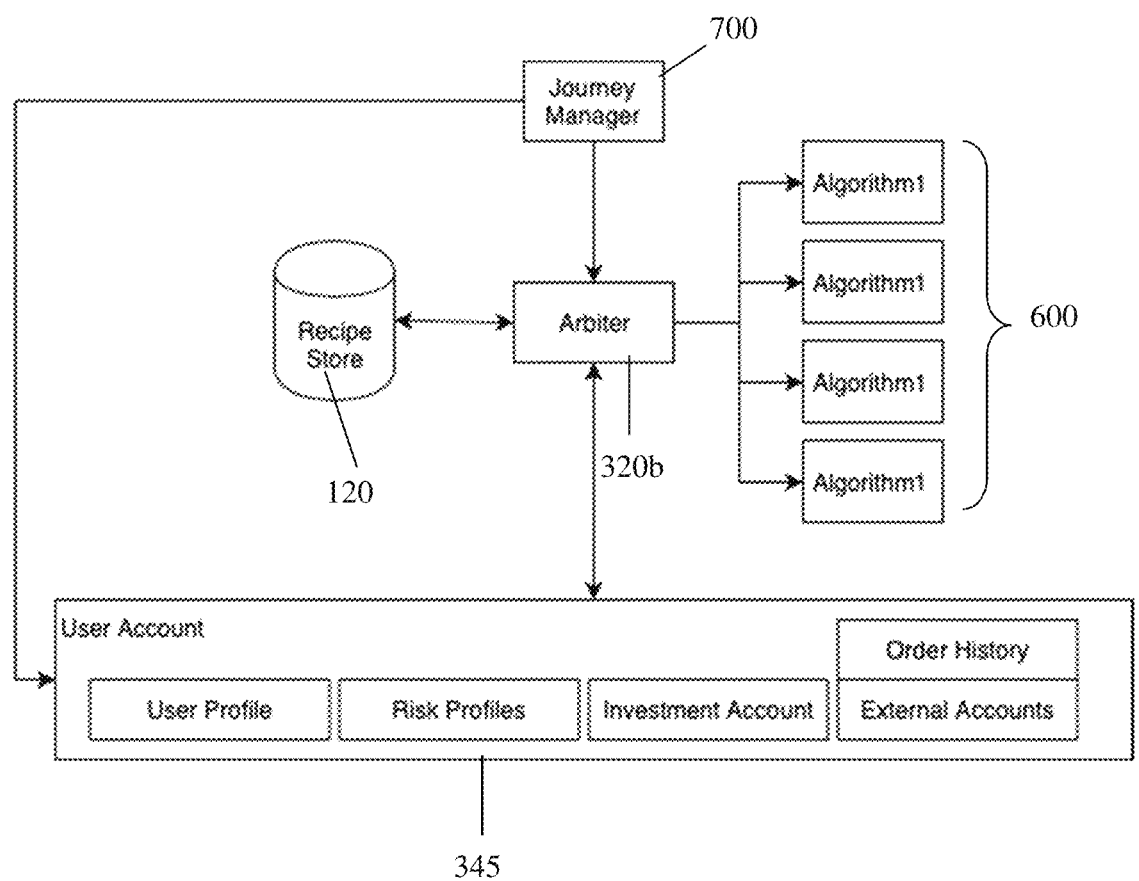
FIG. 7 shows a subset of components shown in FIG. 3 and their interactions in accordance with aspects of the present disclosure.

Building on the example of FIG. 6, FIG. 7 shows a subsystem to tailor recommendations for trading recipes. By way of example, when a user begins transacting with the trading platform, a guide manager 700 (e.g., Charon) is instantiated for the user. The guide manager 700 is a dedicated digital manager for the user as long as they are active on the trading platform. Once the user's session time's out, e.g., 15 minutes of inactivity, the guide manager 700 is destroyed.

In embodiments, the guide manager 700 tracks the recent history of the user. For instance, if a user looks up a series of utilities and/or high risk investments, the guide manager 700 will track that they are currently interested in high risk utilities. This is important as the trading platform not only can make recommendations based on past history, but recommendations based on what a user is doing during his current session. The guide manager 700 can thus be used to tailor recommendations for recipes by tracking the stocks or other trading types the user is looking at, the industry, risk level, and the information they are reading from the news feeds, etc., and provide this to the intelligent opportunity creator for consideration when generating a trading recipe.

Once the arbiter 320b establishes that the user is viewing a particular commodity or sector, the guide manager 700 checks the user account to determine if this is a regular pattern or a new pattern for this session. Since the trading platform can already deliver recommendations based on the user's past history, the guide manager 700 does not need to request new recommendations based on the user's account profile. Instead, the guide manager 700 will focus on the user's current session. Once the guide manager 700 determines that the user is looking at commodities, sectors, trading types, etc., outside their normal trading pattern, the guide manager 700 will want to receive recommendations from the arbiter 320b based on the current session, which will then be provided to the intelligent opportunity creator for consideration when generating a trading recipe.

Illustrative Swim Lane Diagrams Implementing Functionality/Flows of the Trading Platform and Components Thereof Aspects of the present invention are described herein with reference to flowchart illustrations (swim lane diagrams) and/or the block diagrams of methods, apparatus (systems), and computer program products. It will be understood that each block or process of the swim lane diagrams and/or block diagrams, and combinations of blocks in the swim lane illustrations and/or block diagrams, can be implemented by computer readable program instructions as described herein. These computer readable program instructions may be provided to the processor 115 of the computing system 100.

Moreover, the swim lane diagrams illustrate the architecture, functionality, and operation of possible implementations of systems, methods, and computer program products according to various embodiments. In this regard, each block in the flowchart may represent a module, segment, or portion of instructions, which comprises one or more executable instructions for implementing the specified logical function(s). In implementations, the functions noted in the steps may occur out of the order, depending upon the functionality involved. It will also be noted that each step of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Execution of Trading Recipes

Figure 8:
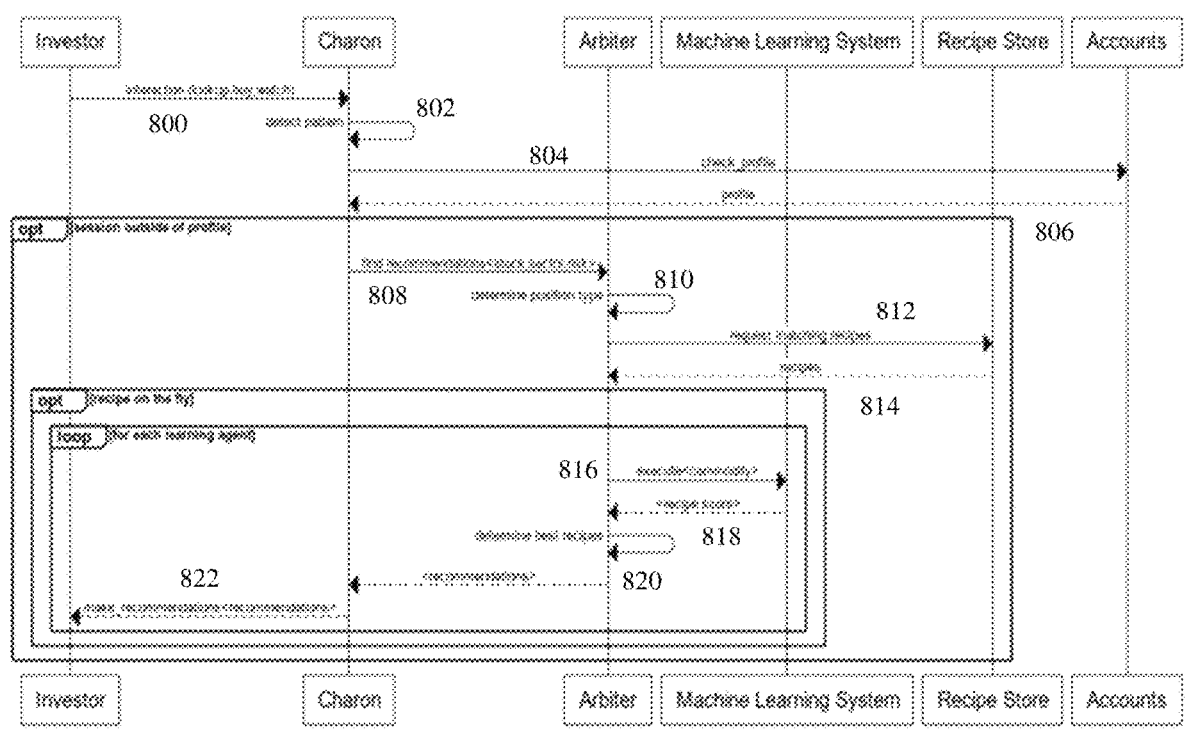
FIG. 8 shows a swim lane diagram of an exemplary process in accordance with aspects of the invention.

FIG. 8 shows a swim lane diagram of an exemplary process in accordance with aspects of the invention. As shown in FIG. 8, several actors are included in the implementation of this illustrative example. These actors include: an investor, a guide manager (Charon), an arbiter, machine learning, a recipe store (repository or storage system) and a user account (account).

Generally, the processes of FIG. 8 include an investor looking at specific trading types. The Charon notices the user keeps browsing the same sector and queries the user account to see if this is part of the investor's regular profile. If it is not, it is determined that the investor is trying something new in this session or onto a lead outside the normal buying sector. The Charon then sends a request to the arbiter to make a new recommendation. The arbiter checks the current recipe store for any running trading recipes. If one exists, it is sent to the user. If one does not exist, a new trading recipe can be created as described herein.

More specifically, in FIG. 8, at step 800, an investor will begin a particular trading type. This particular trading type can include, e.g., buying a particular stock, watching market fluctuations, research, etc., In doing so, the investor will interact with the Charon. At step 802, the Charon will detect a pattern and, at step 804, query the accounts (user account) for a profile of the user. At step 806, the account will provide a profile to the Charon.

At step 808, the Charon will query the arbiter to find recommendations. In embodiments, the arbiter can also query the current Charon to look for trends among different investors. In this scenario, the arbiter queries all Charons looking for a trend among all or any combination of current users. For instance, the Charon sees that 33% of users are looking at the stock "X". This can be determined a significant number of users, in which case the arbiter can then determine if there are recipes for stock "X".

At step 810, the arbiter will determine a position type (e.g., type of trade, research or other associated information) and, at step 812, request a trading recipe from the trading recipe store (e.g., recipe repository). In embodiments, as with a personalized trend, either the Charon or the arbiter can check the current recipe store. If a recipe exists, there would be no need to create a new recipe in real-time and, at step 814, the arbiter will receive the trading recipe from the recipe store. If a recipe does not exist, the arbiter can view current market sentiment, news sentiment and market trends and/or other content feeds to make a recipe hypothesis then submit the hypothesis to the machine learning (e.g., machine learning agents). As with personalized recommendation scenarios, the agents return recipes and ratings for those recipes back to the arbiter. The arbiter then adds a new recipe or group of recipes to the recipe repository and then send the recommendations to the Charon to present as a recommendation back to the user.

In either of the case of a new or existing trading recipe, at step 816, the arbiter will request execution of the recipe using the machine learning, e.g., execution bots. At step 818, the machine learning can provide a recipe score to the arbiter (and/or build a new recipe). The arbiter, at step 820, will determine the best trading recipe based on the information obtained, e.g., using the data of a content feed and/or other internal factors such as a user's trade history and/or profile and/or sentiment. At step 822, the arbiter provides the recipe score to the Charon which, in turn, sends the score to the investors at step 822.

As noted in FIG. 8, the steps 808 to 822 are performed outside of the profile. The steps 816 to 822 are provided in real-time and can be provided in a looped format for each learning agent of the machine learning.

Artificial Intelligence Assisted by a Creator

Figure 9:
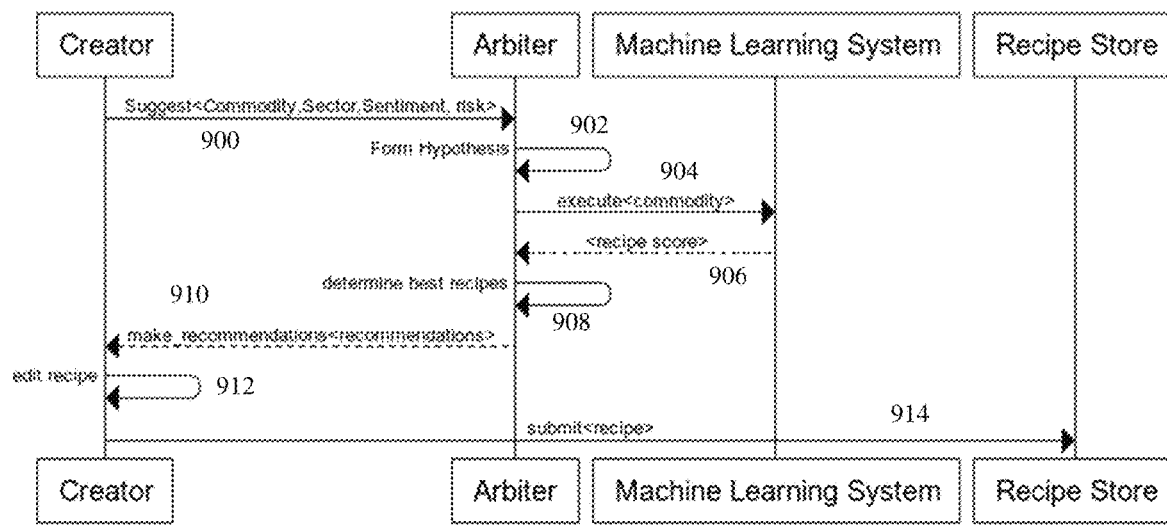
FIG. 9 shows a swim lane diagram of an exemplary process using artificial intelligence assisted by a user in accordance with aspects of the invention.

FIG. 9 shows a swim lane diagram of an exemplary process using an artificial intelligence assisted by a creator in accordance with aspects of the invention. As shown in FIG. 9, several actors are included in the implementation of this illustrative example. These actors include: a creator (opportunity creator or contributor), an arbiter, machine learning (intelligent opportunity creator) and a recipe store (repository or storage system).

A component and capability of the trading platform is the ability of an investor or other user to approve a recipe as well as suggest an alternative recipe, including a bet against the current trading recipe. In this exemplary illustration, part of creating recipes is generating ideas, which can be assisted with the help of a user (e.g., contributor, commentator, investor or other third party) finding new ideas for trading recipes and allowing the creator to suggest a trading opportunity or modification of an existing trading opportunity to the arbiter.

In any of these different scenarios, a user (generally in this section as a "creator") can comment on a trading recipe and suggest an adjustment to the trading recipe by cloning the trading recipe. When this happens, the creator can make a change to the trading recipe and provide a reason why they made such a change. The creator can also recommend a different trading recipe with a similar result. For instance, several persons can believe a "stop" will go down, but the creator thinks a bear call spread is a better play than the current trading recipe, in which case the creator can provide a new play (e.g., revise or create a new recipe or part of a recipe).

Also, the creator may disagree with the trading recipe recommendation all together. In this case, the creator can link an existing, opposing trading recipe for the particular recommended trading recipe or they can suggest an entirely different trading recipe. In these cases, the creator can be guided through a recommendation via a wizard. For instance, if the creator thinks there is an opposing play to a Bull Call Spread, they may want to recommend a different play. In this case, the trading platform will recommend an opposing play to the current play or a group of opposing plays. For instance, the trading platform would recommend a Bear Call Spread as the natural opposing play, but can also list other similar plays that oppose the Bull Call Spread, including more interesting plays, such as a short put butterfly spread that sells multiple puts on different time frames. The machine learning (as a recommendation engine) can even help the contributor setup an Iron Condor play if they think stock will be neutral. The wizard can also determine if the user needs a play, like a strangle if the user believes it will go very up or very down, but does not know which.

The arbiter can use the recommendation and return a recommended set of trading recipes based on the creator's (or other user's) suggestion about a sector, commodity, risk level etc. Accordingly, unlike journey managed trends, the creator can override market sentiment, social sentiment and news sentiment based on their own knowledge. This allows the creator to give a neutral or positive sentiment for a particular factor, such as social sentiment or market sentiment if they are predicting a piece of knowledge that will happen. For example, a creator may think that the upcoming ad during a major sporting event will drive sales of a certain product, so they may adjust the social sentiment as positive (from neutral) for their recipe. In this case, the creator can override sentiments when they ask the arbiter to look for recommendations.

More specifically, in FIG. 9, at step 900, a creator (e.g., investor or other user) can provide a suggestion to the arbiter. The suggestion can be a sentiment or other data point as described herein. At step 902, the arbiter forms a hypothesis overriding the current sentiment of the commodity, sector or other trading type with the creator's sentiments (or other data point). The suggestion is then provided to the machine learning at step 904, which will then create a rating and return the rating (score) at step 906. At step 908, the arbiter will use the score and determine the best recipe for the user. The recipe can be a revision of an existing recipe or a completely new recipe as described herein. At step 910, the recommended recipe will be provided to the creator. The creator has the option of editing the recipe at step 912. At step 914, the creator can submit the newly formulated recipe to the recipe store.

Account Brokering

Figure 10:
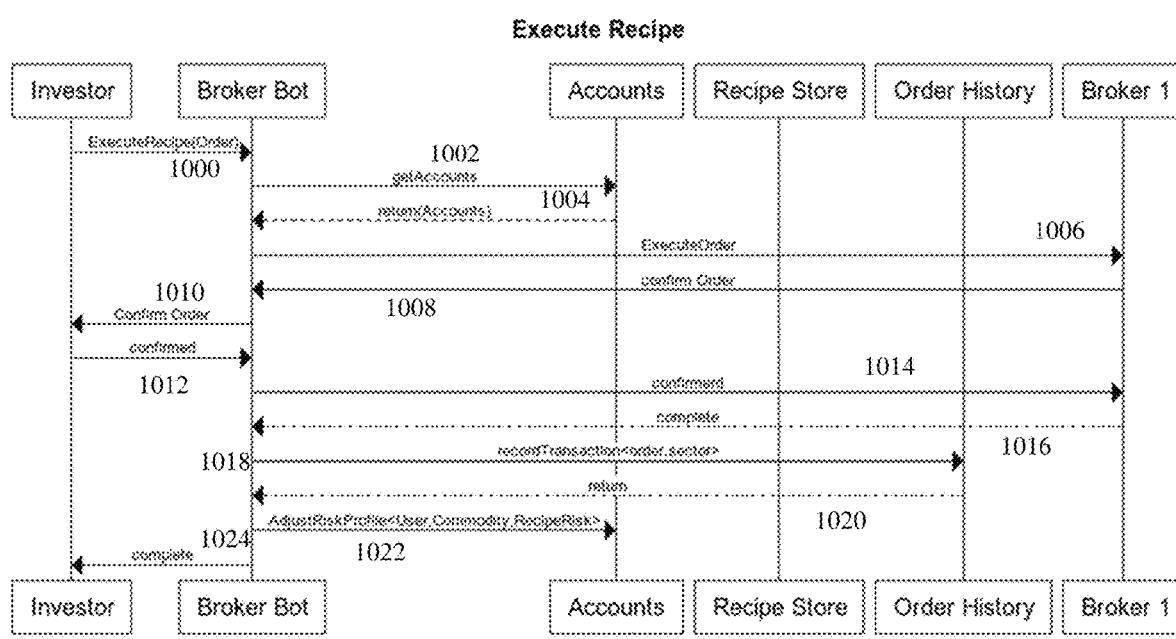
FIG. 10 shows a swim lane diagram illustrating a recipe executed by a broker bot and specific broker in a single commodity transaction in accordance with aspects of the present disclosure.

FIG. 10 shows a swim lane diagram illustrating a trading recipe being executed using a broker bot to a specific broker in a single commodity transaction in accordance with aspects of the present disclosure. As shown in FIG. 10, several actors are included in the implementation of this illustrative example. These actors include: an investor, a broker bot (opportunity execution bot), a user account (account), a recipe store (repository or storage system), an order history and a broker.

In this implementation, a user can submit an order to an outside broker using the trading recipe. When the user places an order, the broker bot is instantiated, which is designed to communicate to the specific backend broker, i.e., brokerage account of the user. This allows the trading platform to instantiate the broker bot specifically designed to manage transactions between the outside broker and the trading platform. Accordingly, in this example, a recipe can be executed using a broker bot to a specific broker in a single commodity transaction. It is important to note that the bot is serverless or computer agnostic. In basic, the broker bot handles the purchasing transaction for the investor. Since each broker has different transaction flows between the broker and the bot, the use of a bot makes maintaining the code to the transaction easy and isolated from other brokers. This also allows the trading platform to place commodity orders to two different brokers simultaneously and asynchronously, but put the order back together as part of the order history to track the transaction across multiple brokers.

More specifically, in FIG. 10, at step 1000, an investor will select and begin a particular trading opportunity by executing a recipe, using an opportunity execution bot (broker bot). At step 1002, the broker bot will query the accounts (user account) for a profile and/or other brokerage information of the user. At step 1004, the user account will provide the brokerage information to the broker bot. At step 1006, the brokerage bot will send the recipe (e.g., trading information) and user information to the broker for execution of the recipe. At step 1008, the broker will sent a confirmation order to the broker bot. At steps 1010 and 1012, the investor and broker bot will confirm the orders. At step 1014, the broker bot will confirm the execution of the order with the broker and, at step 1016, the broker will send a complete message to the broker bot.

At step 1018, the broker bot will send the recorded transaction to the order history. In embodiments, the recorded transaction in the order history can saved as a recipe. At step 1020, a confirmation that the recorded transaction has been received (and saved) is sent from the order history to the broker bot. At step 1022, the broker bot can provide an adjusted risk profile to the user account based on the executed transaction. The adjusted risk profile is based on, for example, the recently executed transaction. At step 1024, the process is completed.

In embodiments, any trade may include a risk profile. This means that the recipe has a risk rating or very low, low, medium, high, extremely high, speculative. Each of these trades has a numeric value associated with the risk. For instance, the internal risk number for very low may be −50 while medium may have a numeric value of 0, and a speculative trade may have a value of 50. When a user executes a trade, the risk profile engine will adjust the user's risk profile by the numeric value of the trade using the following formula.

CurrentRiskRating+(RecipeRisk+ Riskfromlast10trades/11)

This formula creates a lesser effect of trades over time. If the user's trading patterns change over a series of trades, the effect is weighted overall. With a minimum risk of −1000 maximum risk of 1000.

Cross Commodity Suggestions

In further implementations, a user can search for mixed recipes that combine stocks, commodities, options, or any host of assets together as a larger trade that can span multiple markets. For instance, a user wants to invest in a big oil play where an oil tanker of a particular company exploded. Because of this, oil futures will go up, but the user may want to buy an option for a particular company with an option for an oil future. For this scenario, the machine learning will understand the relationship between commodities.

More specifically, the rules engine of the machine learning, for example, can assist in creating cross-market recipes that can cover interrelated commodities. In the example above, there is a relationship between oil and an oil company "Y". The machine learning can define that company "Y" is in a specific sector or sectors, and define commodities associated with the sector. In this case, the Sector is Oil and Gas, the commodities are Oil, Gas, and companies "Y" and "Z" are associated with the section. The rules engine of the machine learning can store configurations on commodities and sectors in the storage system e.g., storage system 120.

The two JSON object below show simple example configurations.

```
Sector:{
"Commodities":[{
        "Name":"Exxon"
        "Type":"Stock",
        "Market":"Stock"},
    {
        "Name":"Oil"
        "Type":"Commodity",
        "Market":"Futures"
    },
]
"Stock":{
    "Sectors":["oil"]
    "Commodities":[{
        "Name":"Toyota"
        "Type":"Stock",
        "Market":"Stock"
    },
]
```

The sector example shows how to tie stocks in a sector with commodities normally traded in that sector. It should be understood, though, that not all sectors will have a commodity accordingly, the second example shows how a stock can be a member of a sector, but it also shows that a stock can have commodities from a sector or commodities specific to that stock that may be outside the sector.

Sentiment Overview

Sentiment serves a role in determining whether to invest in something, and the effect of these sentiments play differently on different trading opportunities, e.g., options trading versus value investing. For this reason, the processes and systems use sentiment analysis to formulate a particular trading opportunity by ingesting, determining and/or implementing whether a piece of writing is positive, negative or neutral based on the attitude of the speaker, and using this information as a factor in generating a trading recipe to execute on that investment opportunity. By looking at sentiment from different factors, it is now possible to determine success factors in buying or selling certain trading opportunities and use this information when generating the trading recipe and using the various sources of sentiment as part of the opportunity package to explain the rationale for a recipe that trades an underlying stock, option, etc. as increasing or decreasing in value that assists the user (investor) in making a decision in executing on that opportunity via a specific recipe.

In embodiments, the systems and processes leverage several types of sentiment including, social sentiment, management sentiment, investor sentiment, and professional sentiment. These sentiments can be obtained by providing links to positive and negative articles about a particular trading opportunity. These links can be the news feeds 310 described above. In the end, each type of sentiment yields a positive or negative sentiment of the subject which, in turn, is used as part of a neural net to determine what patterns to apply to an investment and how to formulate or generate a particular trading recipe for execution by the investor.

Social Sentiment

Social sentiment measures how people on social networks, e.g., Twitter®, Facebook®, and other social media outlets, speak about a stock or other trading opportunity. The systems and processes herein can learn on datasets for words such as, e.g., dislike, stock tanks, hate, etc. to provide a sentiment rating for the trading opportunity and, taking into account the rating, generate different risk profiles of particular trading recipes, as an example. In this way, social sentiment can inform the systems and processes how the general population feels about a company and/or its products and use this sentiment as a factor in generating the trading recipe as described herein.

Management Sentiment

Management sentiment teaches how people feel about the management of a company. Management sentiment is usually pulled from various sources including web articles, social sites and professional sites. This data can commonly be pulled from stock lookups, and used as part of the datamining analysis of a company's management. To use management sentiment, the present solution leverages training of a dataset based off different sources to determine positive and negative analysis of management given a determination of negative and positive stories on management itself. The solution can also take into account members of a company's management team.

Management analysis can be used in short term and long term trading to show the effect of stable management to whether a bad hit versus poor management. In an example, a company's CEO has continually invested cash flow back into the business for years and is evident by many of articles published about the CEO during his tenure at such company. In many cases, people bought into this company for the management and innovation. This is important for many stocks, because, if the management style is perceived as negative, then the stock will have larger drops and lends itself to strategies that profit from this rather than a strong management that may be able to buffer, even a short term negative news cycle with little loss in stock.

Accordingly, by using management sentiment, it is now possible to determine if a company is playing follow the leader or innovating, by keying on words on how management is investing their cash flow, etc. For example, if a management team is pushing profits and lowering investment in future growth, it can be used in a sentiment analysis to show that the company's stock may be inflated temporarily. This sentiment can then be a factor in generating the trading recipe as described herein.

Professional Sentiment

Professional sentiment is derived from viewing overall sentiment of leadership from news articles and professional services, as examples. Professional sentiment is also easily obtained via sentiment analysis augmenting the analysis with the recommendation to buy, hold or sell, as examples.

Implementation of Sentiments

Obtaining sentiment across different groups or platforms is known, but understanding how to apply different groupings of sentiment into a financial equation has been difficult to implement. For example, it is difficult to determine how important social sentiment is to an investment in the short term or long term, or how a certain sentiment should be weighted, e.g., management sentiment on short term and long term investing, etc. As multiple sentiments are not applied to investing today, investors do not currently leverage a multi-sentiment neural net described herein to create stock and options investments, as well as other trading opportunities. To solve these problems, the present approach looks at key variables for short term and long term investing as well as the sector, and applies sentiment based analysis across multiple sentiment groups, balancing the impact of these groups to make future predictions about stocks, options or other trading opportunities.

Figure 11:
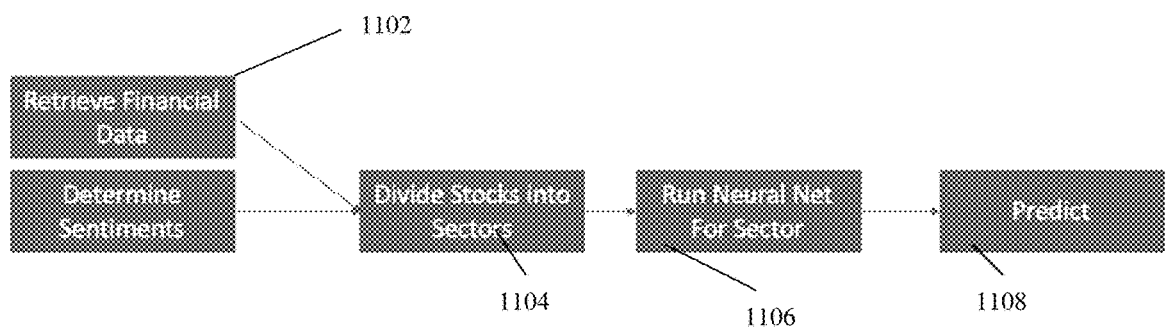
FIG. 11 shows a block diagram showing a sentiment analysis in accordance with aspects of the present disclosure.

As shown in FIG. 11, for example, sentiment is run for each stock (or other trading opportunity) using sentiment analysis for each of key sentiment group. In the example shown in FIG. 11, a sentiment for a particular stock is provided; although, a similar analysis can be used for other trading opportunities. In this example, at step 1102, financial data is retrieved to determine sentiment.

Figure 12:
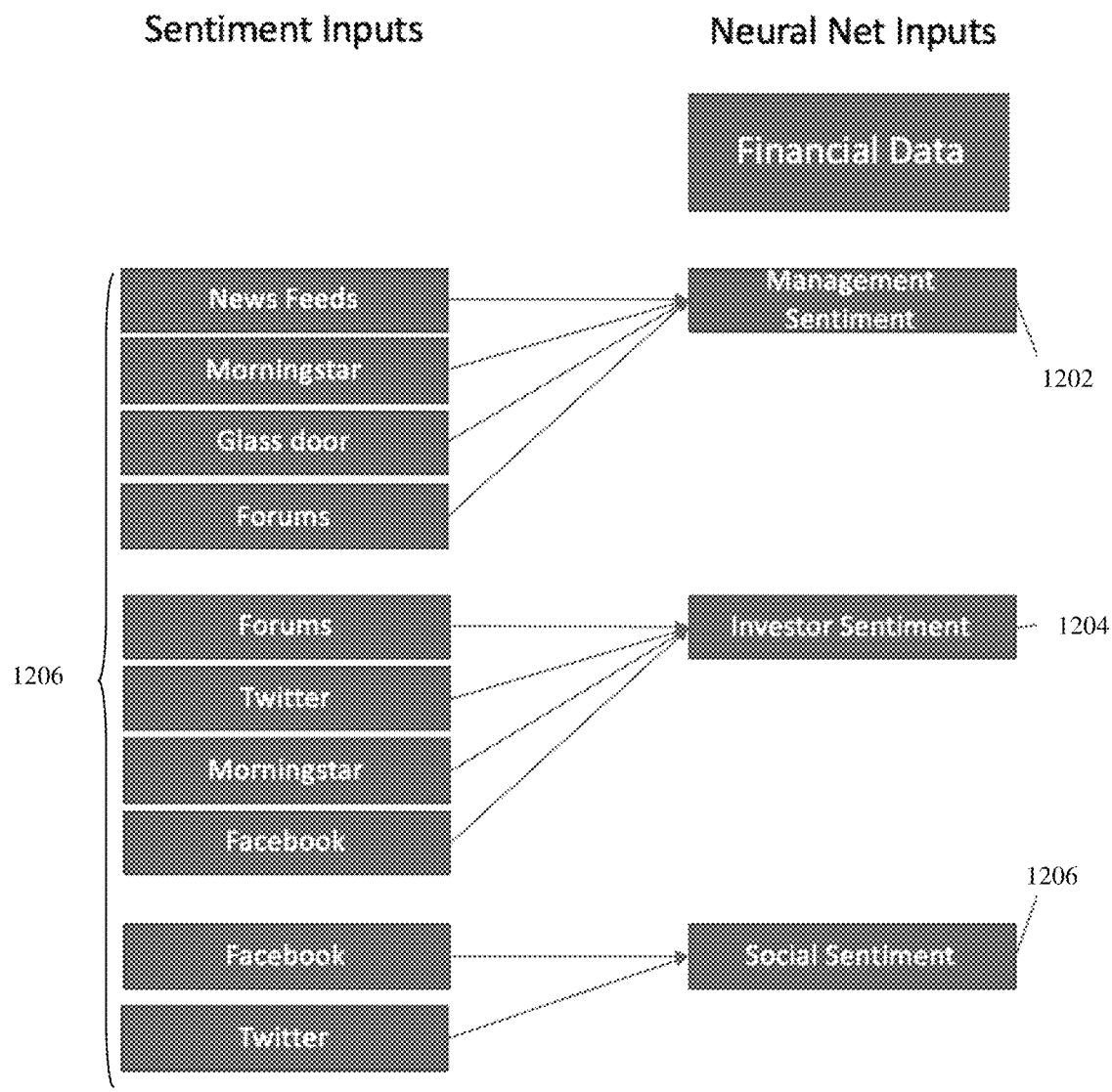
FIG. 12 shows neural net inputs (e.g., sentiment) in accordance with aspects of the present disclosure.

In embodiments, each sentiment (e.g., management sentiment 1200, investor sentiment 1202 and social sentiment 1204) takes input from multiple sources 1206 as shown in FIG. 12. For example, as shown in FIG. 12, some of the sentiments share data sources, such as Twitter®, Facebook® and other financial sources (e.g., Morningstar®). This is permissible as each sentiment tool measures sentiment based on a different dictionary (different datasets). For example, the management sentiment is looking for what professionals, investors and other think about the management for the company. So, the keywords would include members of the management team along with keywords like leadership.

At step 1104, the stocks are divided into sectors. Once the stocks (or other trading types) are divided by sector, the algorithms (e.g., machine learning 320) are split by the type of investment: short term stock, long term stock, option, etc. At step 1106 a neural net is run for each sector and, at step 1108, a sentiment is predicted for each stock in each sector.

Figure 13:
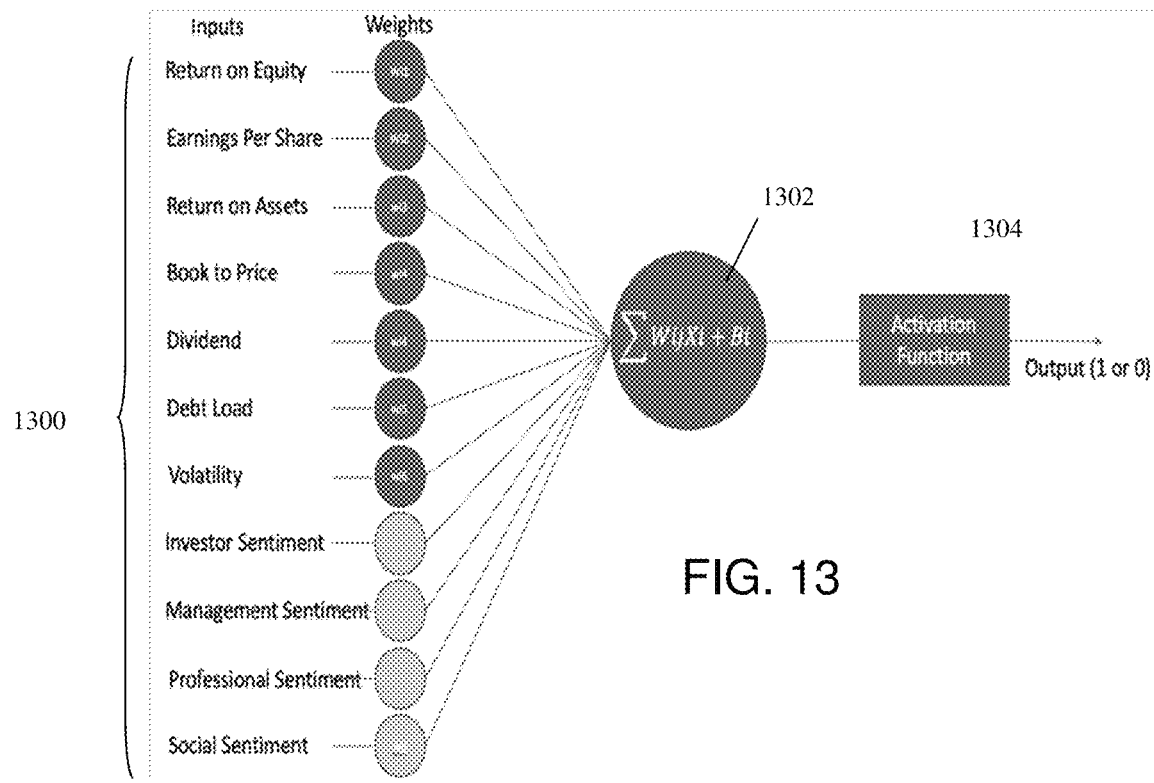
FIG. 13 shows inputs for triggering a neural network in accordance with aspects of the present disclosure.
Figure 14:
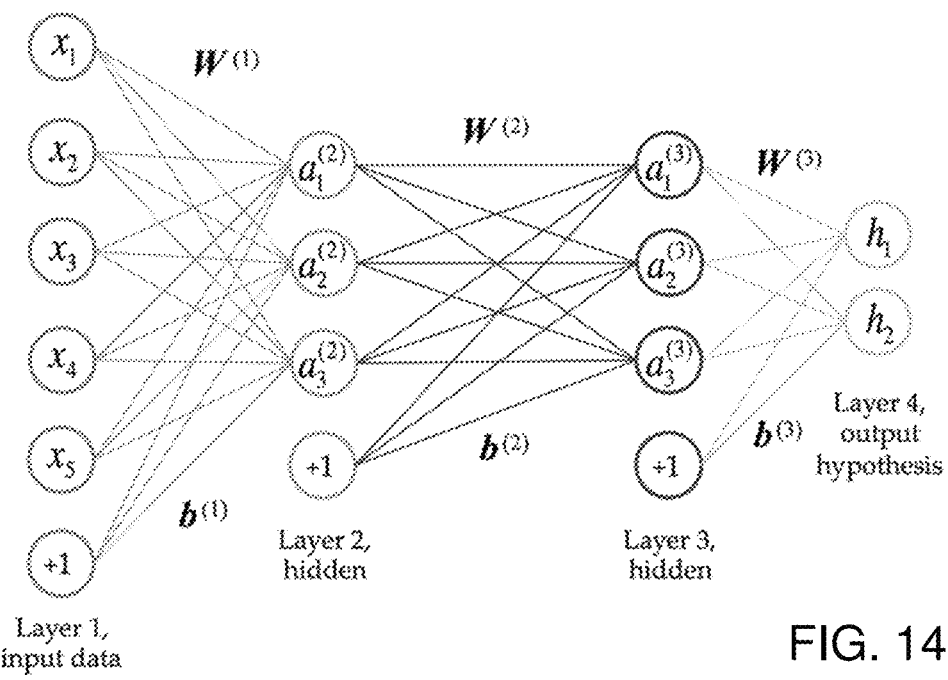
FIG. 14 shows an exemplary training of a neural network in accordance with aspects of the present disclosure.

FIGS. 13 and 14 show the complexity of creating filtered trades that match a trader with recommended trades. More specifically, FIG. 13 shows inputs for triggering a neural network and FIG. 14 shows an exemplary training of a neural network, each of which is in accordance with aspects of the present disclosure.

As illustrated in FIG. 13, as with any deep learning solution, the solution can now be trained with data by looking at past data, the key metrics and sentiments and the outcome of the investment (e.g., did it do up, did it go down). Regardless of the type of investment strategy, the platform described herein will leverage a learning mode. This is because a machine learning solution cannot predict on things it does not know about. Therefore, training different layers of neural network is first performed. This training can be ongoing, which will make the algorithms more robust. In the training, each of algorithms ingests data to tell if the outcome was a gain in price of the stock or a loss or other trading criteria. At this point, there is no concern about profit or loss because the platform will leverage the fact the stock moves up or down to the user's favor in most commodity trading systems, such as stock or options.

In the first layer of our function, the neurons leverage the inputs from the financial data and determine based on the weights of each input if the neuron should fire. In the first layer, for example, the neural network may just look if the stock went up or down based on out data. The example shows a series of financial inputs used in short and long term stocks investing, wherein each one of these values has a numeric representation, e.g., Book to Price is 5.19, Earnings per Share is 46.6, return on assets is 8.85, etc. In the example, there are 11 inputs into the neural net; although any amount of inputs are contemplated herein. Additionally, investor sentiment can be used as determined from performing a sentiment analysis for the investor, e.g., rated at 56% Social Sentiment was 78% positive etc.

The example of FIG. 13 shows a series of financial inputs 1300 used in short and long term stocks investing. In the example of FIG. 13, there are 11 inputs 1300 into a neural net 1304; although any number are inputs are contemplated herein. In the example of FIG. 13, for example, each one of the inputs 1300 is weighted with a numeric representation, i.e., company X has a Book to Price of "w/4", etc. Additionally, an investor sentiment 1302 can be determined from performing a sentiment analysis, which can be rated a positive, negative or neutral, etc. These values are fed into the neural net 1304 to determine whether the investment should or did go up or down, e.g., neuron will fire 1 if the stock went up and a fire 0 if the stock went down.

Referring to FIG. 14, these values are fed into the neuron. In the first layer, it is just necessary to know if the investment went up or down, so the neuron will fire "1" if the stock went up and a "0" if it went down. Once it is determined if a stock went up or down, the layers after are used to determine what percentage is expected for the stock to go up or down based on the inputs. As with any neural network, the network is trained with back data, including past sentiment for each sentiment group as well as pulling in historical data that includes the percentage the stock went up or down for training. And, looking at the illustration of FIG. 14, the neural network will take in the financial and sentiment data in layer 1 and then using the hidden layers it can predict an outcome from the training data used to create a percentage gain, for example.

By way of another example, as with any deep learning solution, the systems and processes are trained with data by looking at past data, key metrics, sentiments and, for example, outcome (e.g., of the investment). Accordingly, regardless of the type of investment strategy, the systems and processes leverage a learning mode to train different layers of the neural network. For example, referring to FIG. 14, in the first layer, for example, neurons leverage the inputs from the financial data such as shown in FIG. 13. In the first layer of FIG. 14, for example, the systems and processes can look to see whether the stock went up or down based on analyzed data shown in FIG. 13. More specifically, the neural network will take in financial and sentiment data in layer 1 and then process data through the hidden layers 2-4 until the predicted outcome from the training data can be used to create a percentage gain or loss on a stock based on the financial and sentiment data.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

In addition, it should be understood that, to the extent implementations of the platform collect, store, or employ information provided by, or obtained from, individuals (for example, trading habits) such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented in a computer infrastructure having computer executable code tangibly embodied on a computer readable storage medium having programming instructions operable to:

determine dynamic risk assessment profiles of different users;

obtain trading information by ingesting streams of data received from content streams comprising disparate electronic sources and placing this trading information into an integrated data source;

generate at least one investment opportunity with a risk profile using the trading information from the integrated data source and matching the investment opportunity with the dynamic risk assessment profiles of a selected user or of the different users;

provide at least one trading recipe which is configured to convert the at least one investment opportunity into a simplified, prepackaged executable trade for the selected user, the at least one recipe based in the dynamic risk assessment profile of the selected user, and which is saved in the integrated data source;

integrate the simplified executable trade for the selected user with an external online trading platform of the selected user by invoking an application program interface (API) to establish an online computing connection between an external online trading platform of the selected user and the simplified, prepackaged executable trade for the selected user;

execute the simplified, prepackaged executable trade through the API for the selected user on the external online trading platform; and track and maintain a history of interactions in an event stream of the selected user including the simplified, prepackaged executable trade to determine behavior of the selected user, and create reconfigured recommendations of trading recipes for execution on the external online trading platform.

2. The method of claim 1, wherein the at least one trading recipe is a plurality of trading recipes each of which have a different risk profile and execution strategies for the selected user.

3. The method of claim 2, wherein the plurality of trading recipes are preconfigured parts of the at least one investment opportunity, that allow the selected user to execute the steps of the at least one investment opportunity with a single action for any number of different trading scenarios.

4. The method of claim 2, wherein the programming instructions are operable to further determine a sentiment associated with the trading information and using the sentiment, in combination with the different risk profiles, to generate the trading recipes with the different risk profiles and matching those to users based on their current characteristics of dynamic risk preference, investment types, and current financial condition.

5. The method of claim 4, wherein the plurality of trading recipes are provided in an opportunity package which includes an opportunity execution plan as a recipe, which details a set of trading steps required to execute on an investment via a broker integration component.

6. The method of claim 5, wherein the investment opportunities and associated trading recipes are stored in an opportunity registry which is a dynamic collection of configured opportunities available to the different users, and which is continuously updated by adding new opportunities, updating opportunities, and removing expired opportunities including previously executed opportunity packages.

7. The method of claim 4, wherein the programming instructions are operable to further match opportunity characteristics with users that are known to select similar opportunities from past trades and generate the trading recipes based on the matched opportunity characteristics and user preference.

8. The method of claim 1, wherein the at least one investment opportunity and associated trading recipe is generated by a user acting as a creator and offered to other users or to limited users based on a privileged access and a user acting as a contributor is capable of accessing the at least one investment opportunity from a creator of the investment opportunity and extending the investment opportunity by adding additional recipes to an opportunity package, or copy and modify the investment opportunity to present a different investment opportunity with similar characteristics.

9. The method of claim 1, wherein the at least one trading recipe is generated by an intelligent opportunity creator comprising a group of intelligent agents based on at least one of past opportunities, past trends, news feeds, social sentiment, user comments, social sharing, and risk profiles to generate a trading opportunity and provide the trading opportunity to the user as the trading recipe.

10. The method of claim 9, wherein the intelligent opportunity creator continuously rates and ranks the opportunities based on integration to various sentiments obtained from different sources that are continuously scanned to calculate a trending user sentiment on a specific opportunity and (i) targets past investors by looking at their order history and (ii) looks at an order history of current investors and recommends personalized investment opportunities based on buying trends or user interactions with current opportunities.

11. The method of claim 9, wherein the intelligent opportunity creator is an arbiter and one or more bots working together to generate new opportunities which are converted into and executed by the at least one trading recipe, wherein the arbiter is a central gateway to new opportunities, and the bots list possible opportunities to the arbiter for further processing and distribution.

12. The method of claim 1, further comprising a recipe template catalog which provides a template where an intelligent opportunity creator creates instances of executable recipes from a template based on a strategy to capitalize on an identified investment opportunity based on an outlook of a creator of the identified investment opportunity or an investor selecting the opportunity.

13. The method of claim 2, wherein the plurality of trading recipes are organized into one or more cookbooks of similar type each of which are subscribed by a specific user of interest to expedite finding of certain types of trading recipes.

14. The method of claim 1, wherein the programming instructions are operable to further provide a leaderboard which tracks a list of successful users over various periods of time based on percentage gains achieved with the trading recipes.

15. The method of claim 1, wherein the trading recipes are executable by a group of users to split cost and benefit amongst the group where the trading recipe is not executed until requirements of the group are met.

16. The method of claim 1, wherein the program instructions are further executable to:

detect mobile network interception and protect files comprising information; and maintain a user repository including a profile, authentication data, preferences, account settings and history of the different users.

17. The method of claim 16, wherein the program instructions are further executable to:

leverage an omni-channel approach to display and communicate the information to the different users such that services can be ingested across different interfaces;

provide visualizations of the simplified, prepackaged executable trade for the selected user;

scan cyclic opportunities and patterns to create the at least one investment opportunity; and recognize past patterns to create new opportunities which are used to generate a new simplified, prepackaged executable trade for the selected user.

18. The method of claim 17, wherein:

the at least one trading recipe details a set of trading steps required to execute an investment;

the trading steps are packaged into the simplified, prepackaged executable trade and include an ability for the selected user to choose between investing in an increase or in a decrease in value at varying degrees; and when the simplified, prepackaged executable trade is executed, record a type of opportunity used by the selected user for targeting the different users to be used at a future time.

19. The method of claim 11, wherein the arbiter maintains posting rules and excludes certain investments to keep them from being posted as opportunities and created into the simplified, prepackaged executable trade for the selected user.

20. A computer program product comprising one or more computer readable storage media having program instructions collectively stored on the one or more computer readable storage media, the program instructions executable to:

determine dynamic risk assessment profiles of different users;

obtain trading information by ingesting streams of data received from content streams comprising disparate electronic sources and placing this trading information into an integrated data source;

generate at least one investment opportunity with a risk profile using the trading information from the integrated data source and matching the investment opportunity with the dynamic risk assessment profiles of a selected user or of the different users;

provide at least one trading recipe which is configured to convert the at least one investment opportunity into a simplified, prepackaged executable trade for the selected user, the at least one recipe based in the dynamic risk assessment profile of the selected user, and which is saved in the integrated data source;

integrate the simplified executable trade for the selected user with an external online trading platform of the selected user by invoking an application program interface (API) to establish an online computing connection between an external online trading platform of the selected user and the simplified, prepackaged executable trade for the selected user;

execute the simplified, prepackaged executable trade through the API for the selected user on the external online trading platform; and track and maintain a history of interactions in an event stream of the selected user including the simplified, prepackaged executable trade to determine behavior of the selected user, and create reconfigured recommendations of trading recipes for execution on the external online trading platform.

21. The computer program product of claim 20, wherein the program instructions are further executable to:

obtain trading prospects and sentiment of the trading prospects from a plurality of electronic sources;

analyze the trading prospects and sentiment of the trading prospects to determine a risk associated with each of the trading prospects;

package selected trading prospects as the at least one investment opportunity with different fixed or configurable trading recipes of the at least one trading recipe, each of which have a different risk and/or investment outlook;

provide the different fixed trading recipes to the selected user in a personalized list;

receive execution instructions for at least one of the different fixed trading recipes and accepting a simplified user action to send the execution instructions to a brokerage account which is integrated with a platform that generated the fixed trading recipes; and provide a confidence score based on raw data passing through a neural net including the sentiment, and which is used to generate the different fixed or configurable trading recipes and optimize them over time.

22. A system comprising:

a user account configured to maintain dynamic risk assessment profiles of different users;

an ingestion engine configured to obtain trading information from disparate electronic sources by ingesting streams of data received from content streams comprising disparate electronic sources and placing this trading information into an integrated data source;

a machine learning engine configured to generate at least one investment opportunity with a risk profile using the trading information from the integrated data source and matching the investment opportunity with the dynamic risk assessment profiles of a selected user or of the different users; and an execution engine configured to convert the at least one investment opportunity into a simplified, prepackaged executable trade for the selected user, an one or more additional engines that:
  integrate the simplified executable trade for the selected user with an external online trading platform of the selected user by invoking an application program interface (API) to establish an online computing connection between an external online trading platform of the selected user and the simplified, prepackaged executable trade for the selected user;
  execute the simplified, prepackaged executable trade through the API for the selected user on the external online trading platform; and
  track and maintain a history of interactions in an event stream of the selected user including the simplified, prepackaged executable trade to determine behavior of the selected user, and create reconfigured recommendations of trading recipes for execution on the external online trading platform, wherein the ingestion engine, the machine learning engine, the one or more additional engines and the execution engine run on a processor of the system, in combination with a computer readable memory, one or more computer readable storage media, and program instructions collectively stored on the one or more computer readable storage media.

23. The system of claim 22, wherein the machine learning engine is trained with different data to be used when generating the different trading recipes of different opportunities with different risk profiles for the user.

* * * * *